United States Patent
Desai et al.

(10) Patent No.: US 10,200,466 B2
(45) Date of Patent: Feb. 5, 2019

(54) MASS RE-FORMATION OF GROUPS IN A PEER-TO-PEER NETWORK

(71) Applicant: MICROSOFT TECHNOLOGY LICENSING, LLC, Redmond, WA (US)

(72) Inventors: Mitesh K. Desai, Redmond, WA (US); Henrique Filgueiras, Kirkland, WA (US); Amer A. Hassan, Kirkland, WA (US); Mukund Sankaranarayan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/685,306

(22) Filed: Aug. 24, 2017

(65) Prior Publication Data

US 2017/0353539 A1 Dec. 7, 2017

Related U.S. Application Data

(63) Continuation of application No. 13/106,638, filed on May 12, 2011, now Pat. No. 9,762,662.

(51) Int. Cl.
*G06F 15/173* (2006.01)
*H04L 29/08* (2006.01)

(52) U.S. Cl.
CPC .................................. *H04L 67/104* (2013.01)

(58) Field of Classification Search
CPC .............................. H04L 64/104; G06F 15/16
USPC ......................................................... 709/228
See application file for complete search history.

(56) References Cited

U.S. PATENT DOCUMENTS

| 7,203,748 | B2 | 4/2007 | Hare |
| 7,616,594 | B2 | 11/2009 | Roberts |
| 8,238,537 | B2 | 8/2012 | Gisby |
| 8,335,937 | B2 | 12/2012 | Oi et al. |

(Continued)

FOREIGN PATENT DOCUMENTS

EP 1478134 A1 11/2004

OTHER PUBLICATIONS

"Final Office Action Issued in U.S. Appl. No. 13/106,638", dated Sep. 25, 2013, 20 Pages.

(Continued)

*Primary Examiner* — Anthony Mejia
(74) *Attorney, Agent, or Firm* — Rainier Patents, P.S.

(57) ABSTRACT

A system in which wireless devices form a group in accordance with a peer-to-peer protocol and, at a later time, a device may send an invitation request to trigger the devices to re-form the peer-to-peer group. The invitation request may contain an identifier that is associated with a set of a plurality of devices. Those devices may be related such that they perform a function for which a user would want to use those devices together. The group of devices, for example, may be multimedia devices that receive and present streaming multimedia content or may be human interface devices that collectively act as an interface for a work station incorporating a wireless computing device operated by a user. Requesting that remote devices concurrently re-form a group reduces the time and spectral congestion associated with re-forming the group, particularly when the remote devices may periodically enter a low power state.

20 Claims, 9 Drawing Sheets

(56) References Cited

U.S. PATENT DOCUMENTS

| | | | |
|---|---|---|---|
| 8,477,941 B1* | 7/2013 | Dhanoa | H04W 36/0038 380/270 |
| 2003/0128713 A1 | 7/2003 | Kang | |
| 2004/0148333 A1 | 7/2004 | Manion | |
| 2005/0160143 A1 | 7/2005 | Bae et al. | |
| 2005/0281208 A1* | 12/2005 | Dorenbosch | H04L 12/189 370/270 |
| 2006/0294244 A1* | 12/2006 | Naqvi | H04M 7/123 709/227 |
| 2007/0022200 A1* | 1/2007 | Benkert | H04L 29/06027 709/227 |
| 2007/0026883 A1* | 2/2007 | Sung | H04W 4/10 455/518 |
| 2007/0223398 A1 | 9/2007 | Luo et al. | |
| 2007/0248114 A1 | 10/2007 | Jia et al. | |
| 2008/0065235 A1* | 3/2008 | Igoe | H04L 12/2809 700/1 |
| 2008/0066123 A1* | 3/2008 | Igoe | H04L 12/2809 455/41.3 |
| 2008/0086566 A1* | 4/2008 | Kumarasamy | H04L 65/1083 709/227 |
| 2008/0155055 A1* | 6/2008 | Shan | H04L 12/14 709/217 |
| 2009/0296689 A1* | 12/2009 | Bakker | H04W 4/90 370/352 |
| 2010/0057920 A1* | 3/2010 | Lee | H04L 65/1093 709/228 |
| 2010/0128701 A1 | 5/2010 | Nagaraja | |
| 2010/0165879 A1 | 7/2010 | Gupta | |
| 2010/0195539 A1 | 8/2010 | Tian | |
| 2010/0325289 A1 | 12/2010 | Dostal et al. | |
| 2011/0010340 A1 | 1/2011 | Hung | |
| 2011/0185200 A1 | 7/2011 | Sim et al. | |
| 2011/0188391 A1 | 8/2011 | Sella | |
| 2011/0276911 A1 | 11/2011 | Choi | |
| 2012/0008526 A1* | 1/2012 | Borghei | H04W 4/021 370/254 |
| 2012/0051345 A1 | 3/2012 | Vedantham et al. | |
| 2012/0182979 A1 | 7/2012 | Vedantham | |
| 2012/0213213 A1 | 8/2012 | Hsueh et al. | |
| 2012/0243524 A1 | 9/2012 | Verma et al. | |
| 2012/0265913 A1 | 10/2012 | Suumaki et al. | |
| 2014/0032349 A1* | 1/2014 | Yerli | G06Q 30/0601 705/26.1 |
| 2016/0100435 A1* | 4/2016 | Bakker | H04M 3/42348 455/404.1 |

OTHER PUBLICATIONS

"Final Office Action Issued in U.S. Appl. No. 13/106,638", dated Dec. 18, 2014, 25 Pages.
"Final Office Action Issued in U.S. Appl. No. 13/106,638", dated Jul. 1, 2016, 26 Pages.
"Non-Final Office Action Issued in U.S. Appl. No. 13/106,638", dated Apr. 1, 2013, 17 Pages.
"Non-Final Office Action Issued in U.S. Appl. No. 13/106,638", dated Jul. 17, 2014, 24 Pages.
"Non-Final Office Action Issued in U.S. Appl. No. 13/106,638", dated Dec. 17, 2015, 22 Pages.
"Non-Final Office Action Issued in U.S. Appl. No. 13/106,638", dated Feb. 27, 2017, 23 Pages.
"Notice of Allowance Issued in U.S. Appl. No. 13/106,638", dated May 18, 2017, 7 Pages.
Wi-Fi Peer-to-Peer (P2P) Technical Specification—Wi-Fi Alliance Technical Committee P2P Task Group Jun. 25, 2010—Draft Version 1.14—pp. 1-153.
Wi-Fi Alliance Technical Committee P2P Task Group, Wi-Fi Peer-to-Peer (P2P) Technical Specification, Jun. 2010, Draft Version 1.14, pp. 1-154.
The Virtual Device: Expanding Wireless Communication Services through Service Discovery and Session Mobility. Published Date; Oct. 3, 2005.
Symbian Foundation Peer-to-Peer WiFi Initiatives (WiFi Direct)—Published Date: Sep. 10, 2010.
More on Netgear's Push2TV ($100. WiFi Direct?)—Published Date: Jan. 16, 2010.
Wi-Fi Direct for Mac Users—Published Date; Nov. 30, 2009.
Redpine Signals Participates in Wi-Fi Direct Plug-fest—Retrieved Date: Oct. 1, 2010.

* cited by examiner

MASS RE-FORMATION OF GROUPS IN A PEER-TO-PEER NETWORK

RELATED APPLICATIONS

This application is a Continuation of, and claims benefit from or priority of U.S. patent application Ser. No. 13/106,638 that was filed on May 12, 2011, and that is incorporated herein by reference in its entirety.

BACKGROUND

Many computers today have radios to support wireless communication. Wireless communication is used, for example, to connect to an access point of a network. By associating with the access point, a wireless computer can access devices on the network or to other networks reachable through that network, such as the Internet. As a result, the wireless computer can exchange data with many other devices, enabling many useful functions.

To enable computers to be configured for association with an access point, it is common for the access points to operate according to a standard. A common standard for devices that connect to access points is called Wi-Fi. This standard was promulgated by the Wi-Fi Alliance, and is widely used in portable computers. There are multiple versions of this standard, but any of them can be used to support connections through access points.

Wireless communications may also be used to form connections directly to other devices without using an access point. These connections are sometimes called "peer-to-peer" connections and may be used, for example, to allow a computer to connect to a mouse or keyboard wirelessly. Wireless communications for these direct connections also have been standardized. A common standard for such wireless communications is called BLUETOOTH®.

In some instances, a wireless computer may concurrently connect to other devices through an access point and as part of a group engaging in peer-to-peer communications. To support such concurrent communication, some computers have multiple radios. More recently a standard has been proposed, called Wi-Fi Direct, that enables both an infrastructure connection and communication as part of a peer-to-peer group with similar wireless communications that can be processed with a single radio. This standard, also published by the Wi-Fi Alliance, extends the popular Wi-Fi communications standard for infrastructure-based communications to support direct connections to devices. In one instance, a PC notebook can connect to an infrastructure via a conventional AP and concurrently to a TV using Wi-Fi Direct.

Such direct connections may be formed among groups of devices. In accordance with the Wi-Fi Direct standard, devices that wish to communicate may exchange messages, formatted as action frames, to form a Group. A Group is then a collection of devices with one device declared (through the peer-to-peer protocol) as Group Owner. Initially forming a group may require user input, such as to enter a PIN or other information that serves to authorize devices to connect with one another. This process of forming an initial connection is sometimes called "pairing."

The Wi-Fi Direct standard includes a mechanism by which devices retain information about other devices with which they have paired. In this way, devices may form persistent groups such that the devices can communicate if a connection between the devices is interrupted. Such a disruption can happen, for example, if one device is turned off or the devices move out of communication range. When the connection between devices in a persistent group is broken, if those devices are later able to support a connection between them, the peer to peer group may re-form without a requirement for repeating the pairing.

For example, when a user provides an input indicating a desire to perform a function involving a remote device, the wireless device may transmit an invitation request to that remote device. The remote device may respond to that invitation request by sending a request to re-join the group. The wireless device and the remote device can re-form the group, allowing communication between those devices, based on information stored as part of forming a persistent group.

SUMMARY

A peer-to-peer communication protocol used by wireless devices to establish distinct peer-to-peer groups, may incorporate a mechanism for a device that has previously been a part of a group with a plurality of remote devices to trigger concurrent re-forming of connections such that those remote devices (or subset of these devices) may communicate. The remote devices may be functionally related such that a user of the wireless device may want to interact with those remote devices together. For example, remote devices, such as a keyboard, display and mouse, that form a work station may be configured to concurrently attempt re-connection with a wireless device such as a computing device configured for wireless communication. But also, though some of the remote devices may be absent, the formation of the Group is meaningful. In the last example, an external mouse can be out of battery, which the user may input through touch, but a group may be formed based on the other devices that are available and with adequate power to communicate.

Related devices may be designated by user input or selected by analysis of capabilities of the devices or in any other suitable way. Regardless of how a set of related devices is selected, the devices may be configured to be members of a group in accordance with a peer-to-peer protocol. Upon detection of a trigger event indicating a scenario in which a user may use the set of remote devices together, a wireless device in that set may send at least one invitation request that triggers concurrent action by the plurality of devices to re-join a group such that communication among the devices in the set may occur according to a peer-to-peer protocol. The invitation request, for example, may incorporate an identifier assigned to all of the devices in the set. In response, remote devices in the set may then concurrently attempt to re-form the group such that the devices in the set may communicate with each other.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
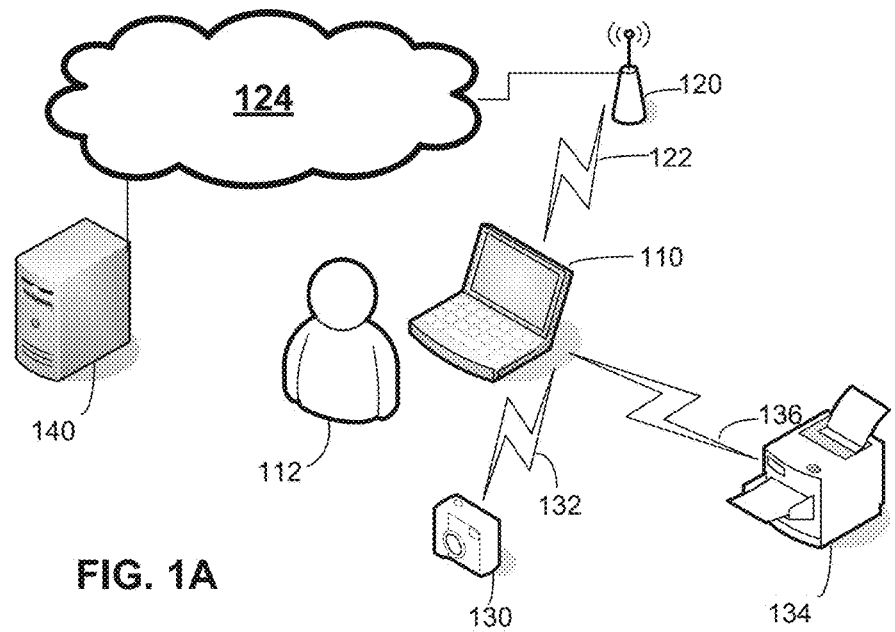
FIG. 1A is a sketch of an exemplary environment in which embodiments of the invention may be practiced.

The Inventors have recognized and appreciated that operation of a wireless device would be more useful to a user of the wireless devices if devices in a set of related devices could concurrently re-form connections allowing for communication with the wireless device. Such an operation may provide faster response to a user command that is completed by use of wireless devices in the set. Decreased connection time may be particularly significant when one or more of the remote devices from time to time enters a low power state in which it is unavailable for communication. In such a scenario, different ones of the remote devices may exit the low power state at different times. Because any of the remote devices that receives the invitation request when not in a low power state may respond, time spent waiting for devices to respond overlaps. As a result, the time for re-connection of all the remote devices may more closely approximate the maximum time to connect with any of the remote devices, rather than the sum of the connect times for all of the remote devices.

Further, such a capability may reduce the amount of wireless transmissions required to form connections with the remote devices. In some embodiments, a single invitation request, or a single stream of similarly formatted invitation requests, may be sufficient to form connections with multiple devices in a set. As a result, the need to send separate messages or separate streams of messages to every device is reduced. In environments in which there are a large number of wireless devices, reducing the amount of communications may reduce spectral congestion, which can in turn improve the performance of all of the wireless devices in that area.

A set of related devices may be selected in any suitable way. In some embodiments, the nature of the devices may be used to select related devices. For example, a wireless device may be programmed to consult metadata associated with devices to determine device types or functions and identify related devices based on this information. Alternatively, a wireless device may be programmed to observe usage patterns of the devices and select a set of related devices based on how they are used. For example, a wireless device may determine that certain wireless devices are accessed during an interval with a frequency that exceeds a threshold, leading to a determination that these devices are functionally related. Alternatively or additionally, user input or other sources of information may be used to select related devices. In some embodiments, the fact that the user has taken action that resulted in forming a group of devices in accordance with a peer-to-peer protocol may be adequate indication that all of the devices in the group are related.

Regardless of how the related devices are selected, the wireless device may associate information with each of the devices that identifies the device as a member of the set of related devices. The information identifying the set of related devices thereafter may be used to signal to the remote devices that each should attempt to re-form a peer-to-peer group incorporating that set of related devices. In response, each of the devices in the set may concurrently communicate in accordance with the peer-to-peer protocol to attempt to re-form the group.

Different remote devices in the set may respond at different times, such as because of different schedules for entering a low power mode or because of a contention resolution mechanism used as part of the peer-to-peer protocol. Nonetheless, during some interval following transmission of the information identifying the set of remote devices, any of the remote devices in the set that is available for connection may communicate in accordance with the peer-to-peer protocol to re-form the group. For example, each device may communicate with a group owner to initiate a connection. The remote devices may communicate in any suitable order, which may be random, such as may occur when the devices employ a contention avoidance mechanism. Alternatively or additionally, the response time of each device may be dictated by factors such as when each of the remote devices exits a low power mode and is able to receive and respond to a message requesting the remote device re-join the group. Regardless, during the interval multiple devices in the set may respond such that one or more devices responds to an invitation request while that invitation request is outstanding to one or more other device in the set. In this way, a group including the set of devices may be re-formed more quickly and with fewer wireless messages than if conventional methods of re-forming a group were employed.

A wireless device may signal to remote devices to re-form a group in any suitable format. The signal may be in the form of an action frame. In some embodiments, the wireless device may use a broadcast communication that is directed to any remote device in the vicinity of the wireless device. In such an embodiment, the wireless device may incorporate into the broadcast communication information identifying the set of devices and the desired action of re-forming a group containing that set of devices. For example, the broadcast communication may be formatted as an invitation request for devices operating according to a peer-to-peer protocol with the addition of information identifying which devices are to take that action. Each set of remote devices may be assigned an identifier, which may be incorporated into the invitation request. This identifier may be incorporated as an information element, encoded as part of an address or represented in any other suitable way.

Alternatively, the wireless device may signal remote devices using multi-cast communications. In this scenario, information included in the communications may indicate the desired action of re-forming a group. However, such messages need not include an express identification of the devices because addressing of the multi-cast message may implicitly identify the devices being requested to re-join the group.

Though, it should be appreciated that a wireless device may signal other devices to re-join a group in any suitable way. The wireless device, for example, may send individual messages. In such an embodiment, the group may be reformed quickly by sending the individual messages in blocks. Rather than waiting for a remote device to respond before sending an invitation request to another device, the block may contain invitation requests for all of the remote devices in the set that have not re-joined the groups. In this way, the devices may concurrently re-join the group because one or more devices may respond to the invitation request while an invitation request is outstanding to one or more other devices.

The forgoing techniques may be used alone or together in any suitable combination in any suitable environment. FIG. 1A illustrates an environment in which a plurality of wireless devices may form a peer-to-peer group. As an example of a peer-to-peer group, devices operating in accordance with a Wi-Fi Direct protocol are described herein. However, it should be appreciated that any suitable peer-to-peer protocol may be used.

In the example of FIG. 1A, computing device 110 is illustrated as a laptop computer. Though, it should be appreciated that the form factor of computing device 110 is not a limitation on the invention. Computing devices configured as tablets, SmartPhones or with any other suitable form factor may be configured and operated according to embodiments of the invention. Moreover, it should be appreciated that any wireless device may play any role in a peer-to-peer group. Accordingly, it is not a requirement that any of the devices in the group be a computing device.

FIG. 1A illustrates that computing device 110 is being operated by user 112. User 112 may interact with computing device 110 using techniques as are known in the art to control computing device 110 to wirelessly connect with other devices.

In this example, FIG. 1A illustrates peer-to-peer wireless connections. Computing device 110 is shown to have connections 132 and 136 to camera 130 and printer 134, respectively. In this case, camera 130 and printer 134 are examples of wireless devices with which computing device 110 may connect in order to exchange data.

Camera 130, printer 134 and computing device 110 may communicate over wireless connections 132 and 136 using a peer-to-peer protocol that supports persistent groups. In this example, camera 130, printer 134 and computing device 110 may form a persistent group according to a peer-to-peer protocol. Though, in alternative embodiments, computing device 110 may form a first group with camera 130 and a second group with printer 134. Accordingly, it should be appreciated that a group may be made up of any suitable number of devices, including only two devices.

Wireless connections 132 and 136 may be formed according to any suitable peer-to-peer protocol. In this example, connections 132 and 136 are formed using an extension of the Wi-Fi protocol, referred to as Wi-Fi Direct. Connections 132 and 136 may be formed as persistent connections, in accordance with that protocol. As a result, each of the devices that forms a group with another device may store group profile information representing groups of two or more devices that have performed pairing in order to establish a connection. The group profile information may be stored during initial pairing of the devices to form a group and later may be used to reestablish a connection if it is disrupted.

The group profile information may include an identifier for the group. The identifier for the group may be generated in any suitable way. For example, in some embodiments, the group may be formed in response to user input designating devices to be connected in a group. In connection with that user input, the user may specify a friendly name for the group. The identifier for the group may include such a friendly name and/or be derived from the friendly name. Alternatively, or additionally, the identifier for the group may be generated based on an identifier for one or more of the devices in the group. As a specific example, an address associated with the device controlling the group may be used as the group identifier.

Regardless of how the group identifier is generated, each device that is a member of the group may be given this group identifier as part of initially forming the group. As a result, each device in the group may identify communications directed to all of the devices in the group, such as an invitation request to trigger the devices in the group to re-form the group. Though, it is not a requirement that the group identifier be used to indicate devices to which an invitation request is directed. In some embodiments, a set of devices intended to concurrently respond to an invitation request may be designated by an identifier separate from the group identifier. A separate identifier may be useful, for example, in a scenario in which a subset of devices in a group is selected for responding concurrently to an invitation request to re-form the group. In such an embodiment, initially forming a group may alternatively or additionally include generating and communicating to selected devices an identifier of a set of devices.

The group profile information may be stored internally to the devices, such as camera 130 and printer 134. Computing device 110 may similarly store that information internally. Though, computing device 110, and any of the other devices, may store that information externally, such as by using a network connection. Accordingly, each of the devices that is a member of a group may store information about the group, which may include an identifier for the group or for a set of devices that can later be requested concurrently to re-form the group.

In this example, computing device 110 also has a wireless connection through access point 120 to network 124. Wireless connection 122 through access point 120 is an example of an infrastructure type connection. Any suitable technique may be used to form wireless connection 122, including techniques that employ known infrastructure type protocols. As one example, wireless connection 122 may be formed using a protocol sometimes called "Wi-Fi." Though, the specific protocol used is not critical to the invention.

In the example illustrated, computing device 110 has the role of a station in wireless connection 122. The role of the computing device 110 indicates the specific steps of the wireless protocol performed by computing device 110 in order to exchange information with access point 120.

Network 124 may be a home network, an enterprise network, the Internet or any other suitable network. However, in the embodiment illustrated, network 124 may be the Internet, allowing computing device 110 to access computing devices, such as server 140, from anywhere in the world the Internet can be accessed.

Having a group of devices may allow a user of a computing device that is a member of the group to access functionality of other devices in the group. For example, user 112, through computing device 110, may copy digital data representing pictures from camera 130 such that those pictures may be presented on a display of computing device 110. Similarly, user 112, through interactions with computing device 110, may send digital data representing an item to print to printer 134. Having both camera 130 and 134 in a group with computing device 110 allows user 112 to interact with both camera 130 and printer 134. Having these devices in a group may also allow data to be conveyed from camera 130 to printer 134 such that a user of camera 130 may cause pictures to be printed at printer 134.

Figure 1B:
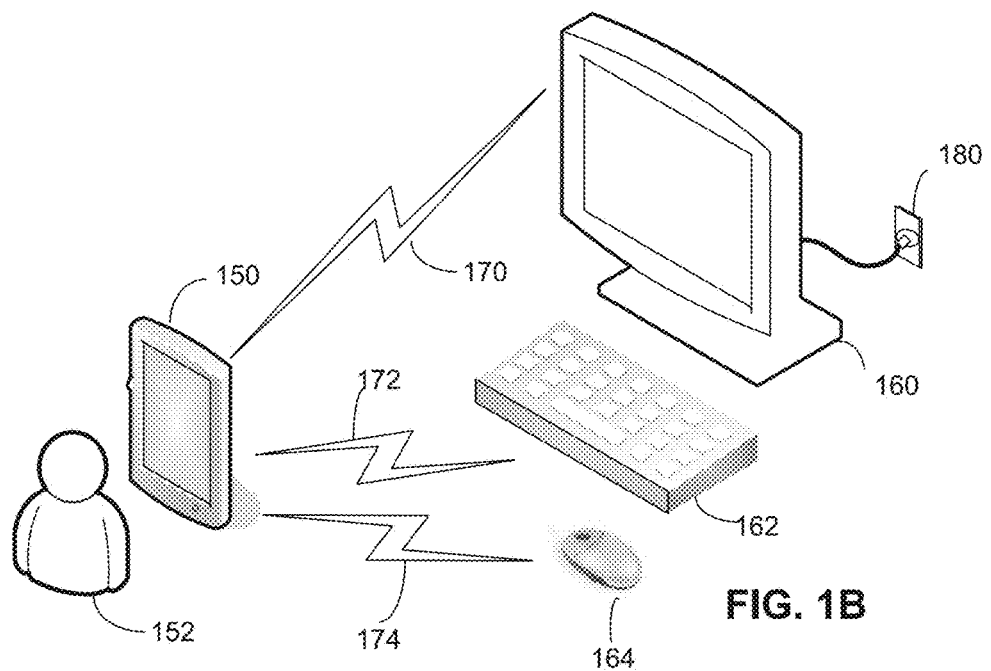
FIG. 1B is a sketch of an alternative exemplary environment in which embodiments of the invention may be practiced.

In a conventional system involving multiple wireless devices, a user may specify devices to be added or removed from a group. In some embodiments, a group may be formed based on the functions of the devices in the group. FIG. 1B illustrates a scenario in which a group incorporates devices that are functionally related. In this example, the devices joined in the group are human interface devices that collectively form a work station to which a computing device may be docked. These devices may be joined in a group based on express user input, which may designated related devices, or may be the result of programming on computing device 150 that identifies devices that perform related functions in close proximity to one another and forms a group involving all of those devices.

In the scenario illustrated in FIG. 1B, a user 152 has brought a computing device 150 into the vicinity of the work station. The work station in this example includes a display 160, a keyboard 162 and a mouse 164. The specific devices that form that group may be selected based on express user input. For example, user 152 may designate through an interface in computing device 150 that display 160, keyboard 162 and mouse 164 should be treated as a group of devices.

Though, the devices forming a group may be selected in any suitable way, including based on the functionality of the devices. For example, computing device 150 may be programmed to identify human interface devices in proximity with each other that can be used together as a work station. In this scenario, as computing device 150 detects remote devices, such as display 160, keyboard 162 and mouse 164, computing device 150 may invite those devices to join a group controlled by computing device 150. In this scenario, as connections 170, 172, and 174 are formed to display 160, keyboard 162 and mouse 164, respectively, computing device 150 may supply to each of the remote devices an identifier for the group.

In accordance with the peer-to-peer protocol used by computing device 150, the group may be a persistent group. After the group is formed, information used or generated during initial device pairing and group formation that can be used to re-form the group at a later time may be retained by the devices in the group. For example, if computing device 150 is turned off after a group has been formed, when computing device 150 is again turned on, computing device 150 may use the stored information to re-establish connections with the remote devices forming the group.

In a conventional peer-to-peer protocol, re-forming a peer-to-peer group may entail a device initiating re-formation of the group sequentially sending invitation requests to each device in the group. Each device receiving such an invitation request may re-join the group by interacting with a device acting as a group controller, here called a "group owner." The device initiating re-formation of the group may then send an invitation request to another device in the group. The process of sending invitation requests and having a targeted device re-join the group may be repeated until all of the devices in the group are again joined in the group.

As a specific example, when computing device 150 is turned on or brought into the vicinity of the work station illustrated in FIG. 1B, computing device 150 may first send an invitation request to display 160. Once connection 170 is re-formed, computing device 150 may send an invitation request to keyboard 162. Once connection 172 is re-formed, computing device 150 may send a further invitation request to mouse 164, resulting in connection 174 being re-formed.

Applicants have recognized and appreciate that this conventional approach for re-forming a group may be undesirable. In the system illustrated in FIG. 1B, display 160 is shown connected to an AC source 180. In this scenario, a receiver within display 160 may be powered on continuously or for long and frequent intervals such that display 160 is likely to receive an invitation request from computing device 150. In contrast, keyboard 162 and mouse 164 are illustrated as wireless devices. These devices may be battery powered and may frequently enter a low power state in which their receivers are powered off to conserve battery power. These devices may occasionally exit the low power state for short intervals in order to determine whether another wireless device is attempting to establish communication with them. Accordingly, as computing device 150 attempts to establish communication with each of the remote devices, computing device 150 may repeatedly transmit invitation requests directed at each of the remote devices. These invitation requests may be repeatedly transmitted in accordance with a pattern that is not coherent with the pattern with which the remote devices awake form the low powered state. In this way, even if the first invitation request is not received by a remote device, a subsequent invitation request will be received by that remote device.

Though the devices in the group may eventually all receive and respond to an invitation request, a finite amount of time may pass until computing device 150 is transmitting an invitation request for a device at a time when that device is listening for communications directed to it. In some embodiments, that time may be on the order of five seconds.

Though such a delay may not, on its own, be perceived by user 152 as unacceptably long, when delays of that magnitude are incurred for every device in a group, the total delay for re-forming the group may be perceived by user 152 as unreasonably long. For example, if a delay of five seconds is incurred for re-forming a connection with display 160, and then a further delay on the order of five seconds is incurred in re-forming a connection with keyboard 162 and a further delay on the order of five seconds is incurred when re-forming a connection with mouse 164, the total delay in re-forming the group of devices that will be used together by user 152 may be on the order of 15 seconds, which may be perceived as undesirable by user 152.

The inventors have recognized and appreciated that scenarios in which a user desires to re-form a group may become more prevalent and that such groups may include a number of devices such that the total delay from having devices sequentially re-join a group may be undesirable for a user. Further, the inventors have recognized and appreciated that the user perception of a total delay may be exacerbated in scenarios in which the group is being re-formed in response to express or implied user input.

For example, user 152 may provide input to computing device 150, indicating that computing device 150 should wake from a low power sleep state. As part of waking from a sleep state, computing device 150 may re-form a group with display 160, keyboard 162 and mouse 164. Because the time taken to re-form that group may be delaying user 152 from accessing computing device 150, the user may experience that delay as unreasonably long even though, in other scenarios, a delay of equal magnitude would not be perceived by the user as negatively affecting the user experience. The inventors have recognized and appreciated that, as use of peer-to-peer connections becomes more prevalent, further scenarios in which a user is waiting on the re-formation of a previously defined peer-to-peer group for completion of an express or implied command will become prevalent. For example, a user of a wireless device may provide an input requesting that multimedia content be presented. Video portions of that content may be presented through a video display device; audio content may be presented through one or more remote devices operating as speakers. A sophisticated sound system may have five or more speakers. Accordingly, a group of devices to be used together to present multimedia content may include six or more devices, for example. A user inputting a command to a device to begin streaming multimedia content to those devices may perceive as undesirable the delay during which the group including those devices is re-formed using conventional techniques.

Accordingly, wireless devices may be adapted to reduce the total time required to re-form a group. Such a reduction in time may be achieved by transmitting, from a device initiating re-formation of the group, one or more messages that trigger other devices in the group to concurrently, rather than sequentially, re-form the group.

Figure 2:
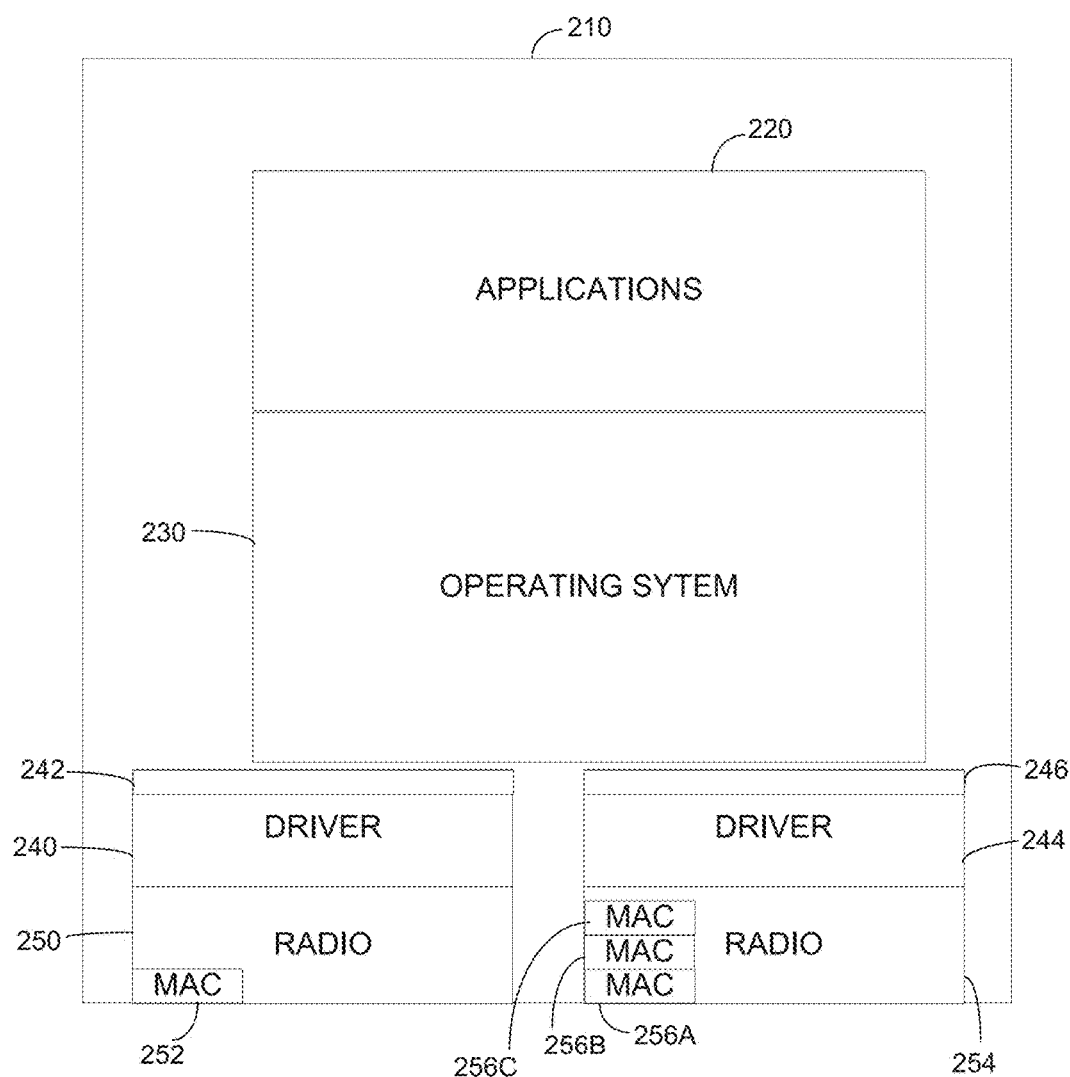
FIG. 2 is a high level block diagram of an exemplary computing device adapted for wireless communication.

Wireless devices operating according to a peer-to-peer wireless protocol that supports concurrent re-formation of groups may be implemented in any suitable way. The wireless devices may in some embodiments be computing devices configured for wireless communication. An exemplary embodiment is provided in FIG. 2. FIG. 2 illustrates, at a high level, an architecture for computing device 210 that may be operated to form an infrastructure mode wireless connection, such as wireless connection 122 (FIGS. 1A and 1B) and peer-to-peer wireless connections, such as connections 132 and 136 (FIGS. 1A and 1B). In the example of FIG. 2, computing device 210 includes two radios, radio 250 and radio 254. Each of the radios may be adapted to send and receive wireless communications. Radio 250, for example, may be used to form wireless connection 122. Radio 254, for example, may be used to form peer-to-peer connections 132 and 136.

In this example, radio 250 has a media access control (MAC) address 252. The MAC address may be a unique identifier associated with radio 250 such that it may be used to distinguish radio 250 from radio 254 and also from radios in any other devices with which computing device 210 may communicate. Accordingly, the MAC address 252 may be included in packets sent by radio 250 to indicate that the frame was sent by radio 250 or may be included in packets directed to radio 250 to indicate that a frame is intended for radio 250.

MAC address 252 may be assigned to radio 250 in any suitable way. It maybe assigned, for example, by the manufacturer of radio 250. Though, in some embodiments, MAC address 252 may be assigned by operating system 230 or another component of computing device 210 or by some other component in a system in which computing device 210 is operating.

Radio 250 may be controlled through software, represented as driver 240 in FIG. 2. Here, driver 240 includes an interface 242 through which operating system 230 may issue commands to driver 240 and through which driver 240 may report status and notify operating system 230 of received data. Interface 242 may be implemented in any suitable way, including according to a known standard. An example of such a known standard is called NDIS, but that standard is not critical to the invention.

Interface 242 may support a number of commands in a format that does not depend on the construction of radio 250. Rather, driver 240 may translate the commands, in the standardized format of interface 242, into specific control signals that are applied to radio 250. Additionally, driver 240 may be programmed to perform certain low level functions associated with a wireless connection. For example, upon receipt of a packet, driver 240 may check that the packet is properly formatted. If the packet is properly formatted, driver 240 may control radio 250 to generate an acknowledgement. Conversely, if the packet is not properly formatted, driver 240 may control radio 250 to transmit a negative acknowledgement.

Though driver 240, and in some instances radio 250, may automatically perform low level functions associated with establishing and maintaining a wireless connection, higher level functions may be performed under control of operating system 230 or applications 220. In some embodiments, an application 220 or operating system 230 may provide a user interface such that ultimate control of wireless communication is provided by a user of computing device 210.

In the embodiment illustrated in FIG. 2, computing device 210 also includes a radio 254. While radio 250 may be used, for example, for a connection to an infrastructure network, radio 254 may be used to form one or more peer-to-peer connections, such as connections 132 and 136.

Radio 254 is incorporated into computing device 210 with generally the same architecture as radio 250. Radio 254 is associated with a driver 244 that provides a mechanism for operating system 230 to control radio 254. Driver 244 has an interface 246 through which operating system 230 may send commands to driver 244 and driver 244 may provide status to operating system 230. Interface 246, like interface 242, may be a standardized interface such that operating system 230 may communicate with driver 244 using a similar set of commands as are used to control driver 240. Though, because radio 254 is used to implement peer-to-peer connections, driver 244 may respond to different or additional commands than driver 240 in order to implement functions associated with peer-to-peer communications that do not exist for infrastructure based communications.

As an additional difference between radios 250 and 254, radio 254 is illustrated as having multiple MAC addresses. In contrast, radio 250 includes a single MAC address 252. Here, MAC addresses 256A, 256B and 256C are illustrated. Multiple MAC addresses, for example, may be assigned by a manufacturer of radio 254 or the MAC addresses may be assigned in any suitable way, including as described above in connection MAC address 252. Alternatively, one or more of the MAC addresses may be assigned based on an identifier of the user of computing device 210.

Having multiple MAC addresses allows radio 254 to appear to devices external to computing device 210 as multiple entities, each with a separate MAC address. As an example, if computing device 210 is separately communicating as a group owner in a first peer-to-peer group and as a client in a second peer-to-peer group, separate entities may be established for the group owner and the client. Devices external to computing device 210 may address packets intended to be processed by computing device 210 as a group owner in the first group with a first MAC address. Packets intended to be processed as a client in the second group may be addressed with a second MAC address. Similarly, computing device 210 may insert the first MAC address in packets coming from the group owner, packets from the client may include the second MAC address.

To allow operating system 230 to associate its interactions with driver 244 with a specific one of those entities, internal to computing device 210, each of the entities may be represented as a port. Accordingly, operating system 230 may send commands to or receive status information from each such entity through a port associated with that entity.

Each of the ports may be configured to perform functions appropriate for the type of entity the port represents. An embodiment in which computing device 210 operates according to a Wi-Fi Direct, which is used herein as an example of a peer-to-peer protocol, a device that is part of a peer-to-peer group may take on a role of a group owner or a client. A group owner may be required in accordance with a wireless protocol to send certain types of action frames and respond to other types of action frames in specified ways. A device configured as a client may send different action frames and responses or may send the same action frames and responses in different contexts.

Though, it should be appreciated that a group owner and a client are just two examples of the roles that radio 254 and driver 244 may be configured to perform. As another example, an entity may be configured as neither a group owner nor a client. Rather, an entity may be assigned a role as a controller that manages interactions with other devices to form a group and determine the role of computing device 210 in that group.

Though FIG. 2 illustrates separate radios, radio 250 and radio 254, in embodiments in which infrastructure connections and peer-to-peer communications operate using the same frequency channels, a single radio may be used. In such an embodiment, entities performing roles associated with infrastructure communication and entities performing roles associated with peer-to-peer communications may be implemented with the same radio.

Figure 3:
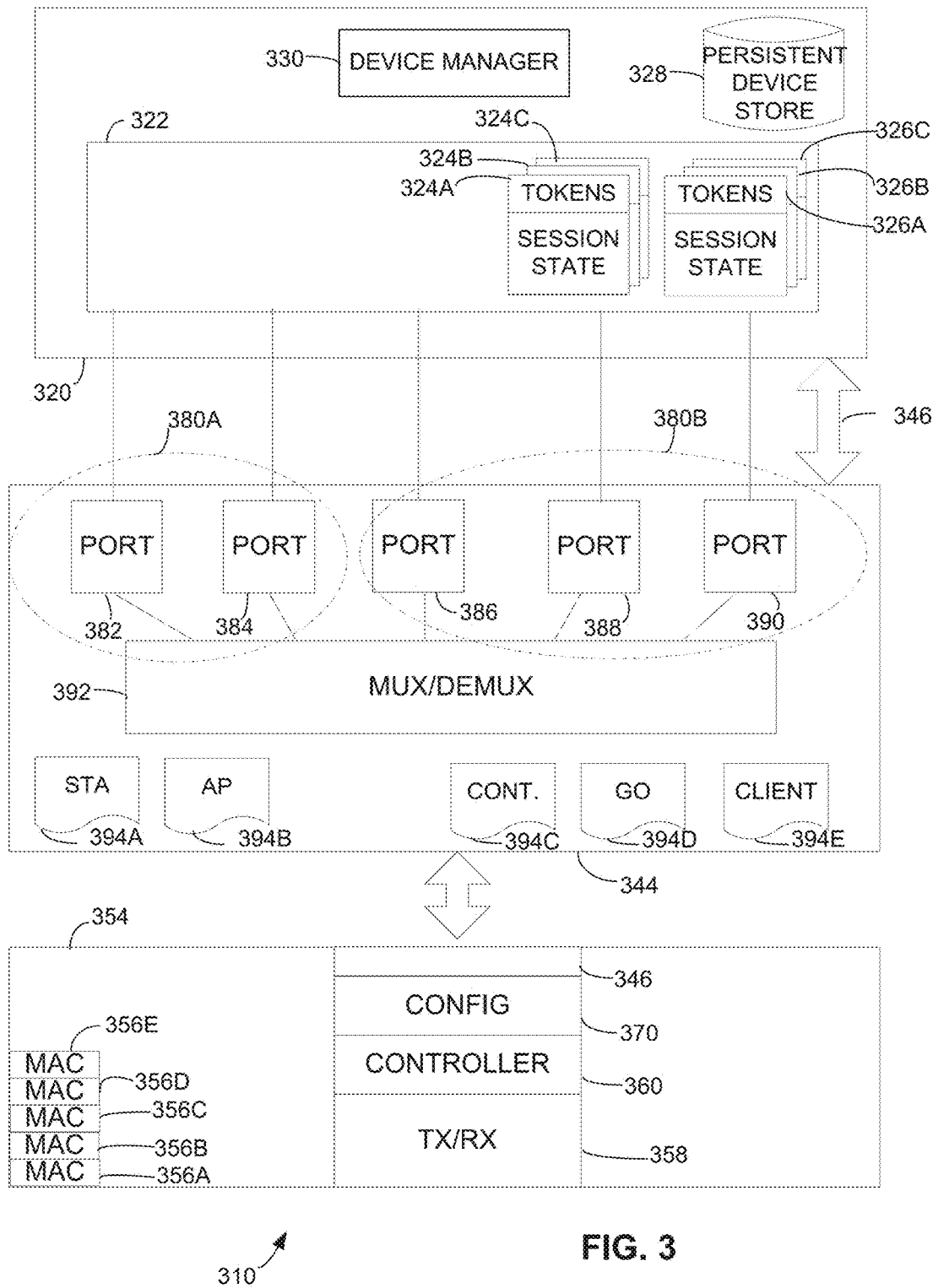
FIG. 3 is a more detailed block diagram of an exemplary computing device adapted for wireless communications.

FIG. 3 illustrates an embodiment in which a computing device 310 is configured to support, using a single radio, both entities that have a role in an infrastructure network and entities that have a role for peer-to-peer communication. FIG. 3 illustrates computing device 310 containing a radio 354. Radio 354 is illustrated as having multiple MAC addresses, illustrated as MAC addresses 356A, 356B, 356C, 356D and 356E. Though five MAC addresses are illustrated, which may allow radio 354 and its associated driver 344 to concurrently provide five ports, it should be appreciated that the specific number of MAC addresses supported is not critical to the invention and more or less than five MAC addresses may be used in some embodiments.

In this example, the five MAC addresses may be used to provide five ports 382, 384, 386, 388 and 390, each configured to perform a different role. In the scenario illustrated, a group 380A of these ports has been configured to implement entities used for infrastructure based communications. Group 380B contains ports configured for peer-to-peer communications.

In the example illustrated in FIG. 3, group 380A contains two ports, ports 382 and 384. Group 380B is shown containing three ports, ports 386, 388 and 390. It should be appreciated that the number of ports allocated for each type of use is not critical to the invention and any suitable number may be used. Moreover, it is not a requirement that the number of ports in each group remain static. Rather, operating system 320 may issue commands to driver 344 to dynamically create or break down ports as needed.

In conjunction with a command to create a port, operating system 320 may specify a role associated with that port. Driver 344 may respond to such a command by creating a port configured for a designated role, which may be associated with infrastructure-based communications or with peer-to-peer communications. Though operating system 230 may specify a role, the role specified may be determined in any suitable way. For example, when forming a peer-to-peer group, operating system 320 may determine the role by controlling computing device 310 to wirelessly exchange messages with other devices in the group to collectively negotiate a role for each device.

Though any suitable mechanism may be used to implement a capability to assign a role to computing device 310, FIG. 3 illustrates an interface 346 between operating system 320 and driver 344. Interface 346 may be an interface to a driver in a standardized format. As one example, some drivers are written in accordance with the NDIS interface specification. In accordance with that specification, commands and status information may be exchanged between driver 344 and operating system 320 using programming objects called OIDs. The NDIS standard defines a number of OIDs that drivers should or may respond to. The standard, though, is extensible such that OIDs may be defined to support additional functionality in certain circumstances. This extensibility may be used to define commands, using OIDs or other suitable representation, that allows operating system 320 to command driver 344 to create or break down a port or to configure a port for a specific role.

Though radio 354 can process packets for multiple ports, other than supporting multiple MAC addresses, radio 354, in some embodiments, need not be specially configured for supporting ports. Radio 354 may be implemented using techniques as are known in the art. In this example, transmitter/receiver section 358 may be a hardware component as is known in the art and used for wireless communications. In this example in which radio 354 is being used to support communications in accordance with the Wi-Fi infrastructure-mode protocol and the Wi-Fi direct protocol for peer-to-peer communications, transmitter/receiver section 358 may support communications in multiple subchannels over a frequency range defined by the Wi-Fi specification. Though, the specific operating characteristics of transmitter/receiver section 358 may vary depending on the specific protocol implemented for communication and are not critical to the invention. Likewise, controller 360 may be a hardware component as is known in the art of wireless radio design. Similarly, configuration register 370 may be a hardware component as is known in the art of wireless radio design. The components indicated as MAC address 356A . . . 356E may also be implemented using techniques as are known in the art. In some embodiments, the MAC addresses supported by radio 354 may be encoded in a read only memory or other component that is a portion of radio 354. Though, it should be appreciated that, in embodiments in which MAC addresses are assigned to radio 354 through driver 344, MAC addresses 356A . . . 356E may be physically implemented in either volatile or nonvolatile rewriteable memory such that the pool of MAC addresses to which radio 354 can respond may be dynamically created.

Regardless of the manner in which the components of radio 354 are implemented, radio 354 may contain a hardware interface 346 through which driver 344 may control radio 354. In some embodiments, driver 344 may be computer executable software instructions executing on a processor within computing device 310. Accordingly, hardware interface 346 may be implemented as a bus connection or other suitable interconnection between the processor executing driver 344 and a separate card holding radio 354. Though such hardware interfaces are known in the art, any suitable interface may be used.

To configure radio 354 to support a port, driver 344 may configure radio 354 to process packets for a specific MAC address associated with communications through that port. Driver 344 may write a value into configuration register 370 indicating that a MAC address should be activated such that radio 354 will process received packets identified with that MAC address. In operation, controller 360 may control transmitter/receiver section 358 to respond to any packets identified with a MAC address identified as active by information in configuration register 370. Accordingly, if multiple ports are active, configuration register 370 will contain an indication of each of the active MAC addresses.

In addition to configuring radio 354 to respond to a MAC address for a port, driver 344 may specify communications parameters to be used with that MAC address. These parameters may specify, for example, that a different number of subchannels may be used for communication with different MAC addresses. In this way, communication characteristics of different ports may be controlled based on the role associated with the port. As a specific example, a port configured as a control port may require lower bandwidth than a port for communicating data. Accordingly, radio 354 may be configured to use fewer subchannels or a different encoding scheme for a MAC address that is associated with a control port.

For information to be transmitted, driver 344 and/or radio 354 may be operated such that any frames transmitted containing such information will be identified by the MAC address associated with the port for which the information is being transmitted. Any suitable mechanism may be used to associate MAC addresses with specific frames sent from or received for a specific port. Moreover, this processing may be performed partially or totally within driver 344 and partially or totally within radio 354 because the specific implementation does not impact functioning of the ports.

To implement multiple ports, driver 344 may also be configured. In this example, driver 344 is illustrated to contain computer executable instructions that implement a multiplexer/demultiplexer 392. Multiplexer/demultiplexer 392 operates to route received packets associated with a port to a portion of driver 344 that implements the functionality of the respective port. Conversely, multiplexer/demultiplexer 392 receives packets for transmission from any of the ports and mutes those packets to radio 354.

In scenarios in which multiple ports simultaneously have information for transmission, multiplexer/demultiplexer 392 may mediate to establish the order in which radio 354 receives information from the ports. For this purpose, multiplexer/demultiplexer 392 may use any suitable policy. For example, packets carrying action frames may be given priority over packets with data frames. As another example of a policy, transmissions associated with ports operating in infrastructure mode may be given priority over ports operating in peer-to-peer mode. As yet another example, a port configured for the role of group owner may be given priority over a port configured for the role of client in a peer-to-peer group. Though, the specific policies applied by multiplexer/demultiplexer 392 are not critical to the invention, and any suitable policies may be employed.

In addition to configuring multiplexer/demultiplexer 392 to route packets, driver 344 may be configured by associating specific functional modules with each of the ports. The specific functional module associated with the port may be based on the role assigned to that port. For example, FIG. 3 illustrates five functional modules. Functional module 394A, when associated with a port, may configure that port to operate in the role of a station in an infrastructure network. Similarly, functional module 394B, when associated with a port, may configure that port for the role of an access point in an infrastructure network. Functional module 394C, when associated with a port, may configure that port for operating in the role of a controller in peer-to-peer mode. The controller, for example, may control communications as the device negotiates or renegotiates a role in a peer-to-peer group. Functional module 394D, when associated with a port, may configure that port for the role of group owner in a peer-to-peer group. Functional module 394E, when associated with a port, may configure that port for the role of client in a peer-to-peer group. Other functional modules, though not illustrated in FIG. 3, may alternatively or additionally be included.

Functional modules 394A . . . 394E may be implemented in any suitable way. For example, each of the functional modules may be implemented as a collection of computer executable instructions that are encoded to perform functions for the role associated with the functional module. For example, functional module 394A may be encoded with instructions that control radio 354 to transmit packets as appropriate for a station in an infrastructure network. Additionally, functional module 394A may contain instructions that allow driver 344 to interact with operating system 320 in a way that implements the behaviors of a station in an infrastructure network. As a specific example, functional module 394A may be encoded to automatically generate responses to certain received frames. Additionally, functional module 394A may be encoded to transfer data received in a frame to a location in memory on computing device 310 and then notify operating system 320 that data has been received. Further, functional module 394A may configure radio 354 for the role of that functional module. Such configuration may include setting a number of subchannels or other parameters of the wireless communications used in the specified role. The operations performed by functional module 394 may be similar to those performed in a conventional driver for a wireless network interface card configured only as a station in a Wi-Fi network, and functional module 394 may be encoded using techniques as are known in the art.

Each of the other functional modules may be similarly encoded to interact with the operating system 320 and radio 354 to configure radio 354 and to internally process and generate communications as appropriate for its respective role. Functional module 394B, for example, may be encoded with computer executable instructions that perform operations on or respond to received frames with behaviors as are known in the art for an access point in an infrastructure network. Also, functional module 394B may be encoded to interact with operating system 320 using techniques as are known in the art.

Functional module 394C may be encoded to perform functions associated with establishing a peer-to-peer group. The instructions that implement functional module 394C may likewise be written using techniques that are known in the art. Those instructions may cause radio 354 to transmit packets containing action frames or responses to action frames of the type used in establishing a group for peer-to-peer communication according to a specific protocol and that negotiate or renegotiate roles of devices for such a group. Components within operating system 320 may trigger the sending of those action frames. Though, for some action frames, functional module 394C may be configured to generate a response to an action frame without express action by operating system 320. Table 1 lists examples of action frames that functional module 394C may be commanded to send by operating system 320. These action frames represent action frames appropriate for a Wi-Fi Direct protocol. Additional action frames used in that protocol may be sent without an express command in response to a received action frame or other suitable trigger. Though, it should be appreciated that different or additional action frames may be used for different protocols, and the specific action frames is not a limitation on the invention.

TABLE I

| Action Frame | Dialog Token Generated by Driver | Port Remains Available After Successful Transmission For Receiving Replies | Receive Indicated to OS |
|---|---|---|---|
| GO Negotiation Request | Yes | Yes | Yes |
| GO Negotiation Response | No | Yes if the response indicates that the negotiations were successful, No Otherwise | Yes |
| GO Negotiation Confirmation | No | No | Yes |
| P2P Invitation Request | Yes | Yes | Yes |
| P2P Invitation Response | No | No | Yes |
| Provision Discovery Request | Yes | Yes | Yes |
| Provision Discovery Response | No | No | Yes |

When the operating system 320 submits a request to a control port to send one of the action frames in Table I, functional module 394C within driver 344 may take actions such as:

a. Select a dialog token for the transmission. If the send is in response to a request, the operating system may provide the dialog token (as described below) to be used, and driver 344 may then use the specified dialog token.

b. Complete the request. If driver 344 selected the dialog token, it may report the dialog token to the operating system 320 in the completion of the request.

c. Sync with the Wi-Fi Direct device to which the frame is targeted. Depending on the implementation, if the send is in response to a received request (e.g. Invitation Response sent on reception of an invitation request), this step may be omitted.

d. Send the frame & wait for an ACK.

e. Once the ACK for the frame is received or if none of the retry attempts get an ACK, send a NDIS_STATUS indication to operating system 320 to notify about the transmission status of the action frame. This indication may include the information elements from the packet containing the action frame.

If the send was for a frame that would receive a reply from the peer device and the transmission was successful, the port may remain available for the peer device to send reply action frames to the miniport. The timeout and mechanism of being available may follow the Wi-Fi Peer-To-Peer Technical Specification.

The specific component within operating system 320 that triggers functional module 394C to send action frames when functional module 394C is associated with a port is not critical to the invention. However, FIG. 3 illustrates a device manager 330 within operating system 320. Device manager 330, for example, may be a device manager as is known in the art that may present a user or programmatic interface through which a user or other executing component may request that a communication session be established with a device or a group of devices using peer-to-peer communication.

When a port, such as port 386, is configured to act as a controller for peer-to-peer communication by associating that port with functional module 394C, device manager 330 may interact with port 386 to control various aspects of establishing peer-to-peer communication with one or more devices. For example, device manager 330 may receive user input requesting that computing device 310 be wirelessly connected to a device such as printer 134 (FIG. 1A) or a group of related devices, such as display 160, keyboard 162 and mouse 164 (FIG. 1B). In response to such input, device manager 330 may interact through stack 322 with port 386, causing functional module 394C to control radio 354 to transmit action frames.

The transmitted action frames may be those associated with device or service discovery. Device manager 330 may specify the nature of those requests, such as whether functional module 394C should seek to discover any device in the vicinity of computing device 310 or only devices that provide an identified service, such as a printer service. Though, device manager 330 may be configured to send commands in other formats through port 386 to establish communication with one or more devices in a group.

As an example, FIG. 3 shows that operating system 320 maintains a persistent device store 328. Persistent device store 328 may contain information identifying devices with which computing device 310 has previously established wireless communication. Such information, for example, may constitute persistent group profiles, which may include an identifier used to signal a set of devices to concurrently re-form a group. Device manager 330 may access information in persistent device store 328 to identify specific devices and send commands through port 386 for functional module 394C to generate action frames to establish a wireless connection with a device identified in persistent device store 328. These actions may occur automatically, in response to user input or in response to any other suitable trigger.

In scenarios in which device manager 330 requires information, such as a password or identifier, to establish communication with an external device, device manager 330 may alternatively or additionally interact with a user through a user interface (not expressly shown in FIG. 3) to obtain that information from a user or some other source. That information, which, for example, may be obtained during pairing of computing device 310 to one or more remote devices, may be stored in persistent device store 328. In this way, information obtained from a user, such as during a pairing ceremony with a remote device need not be acquired from the user again to re-establish a peer-to-peer connection with the remote device. Rather, the information may be obtained from persistent device store 328. Though, regardless of the manner in which information input from a user is acquired, when that acquired information needs to be transmitted, device manager 330 may interact with the port configured as a controller to cause that information to be sent.

Regardless of the mechanism that triggers a port configured as a control port, such as port 386, to identify a group of devices, the control port may send and receive action frames to identify one or more devices that form a group including computing device 310. The actions initiated through port 386, in addition to identifying the group, may negotiate a role for computing device 310 within that group. In the illustrated example of the Wi-Fi Direct peer-to-peer protocol, a device may have a role in a group as the group owner or as a client. Communication with another device or devices in the identified group may be performed through a different port. That port may be configured to support behavior in the role identified for computing device 310.

In the example illustrated in FIG. 3, additional ports 388 and 390 are illustrated. Each of these ports may be associated with a different role. For example, port 388 may be associated with the role of group owner. Port 390 may be associated with the role of client. Configuring a port for a different role may be performed by associating the port with the functional module that performs operations associated with the role. For example, functional module 394D, which performs functions associated with a device operating as a group owner, may be associated with port 388. Likewise, functional module 394E, which performs functions associated with the device operating as a client, may be associated with port 390.

In operation, as packets are received through radio 354 having MAC addresses associated with ports 388 or 390, multiplexer/demultiplexer 392 will route those packets for processing within the associated port. Packets routed to port 388 may be processed by functional module 394D, which may perform actions associated with the role of a group owner. Packets containing data frames may be processed by placing the data in memory and notifying stack 322 that data has been received. Such an interaction with operating system 320 may use stack signaling techniques as are known in the art. Though the specific mechanism by which communication between each port and operating system 320 occurs is not critical to the invention.

When action frames are sent as part of a session established with a group in which computing device 310 is the group owner, those action frames may likewise be routed by multiplexer/demultiplexer 392 to port 388. Functional module 394C may be configured to either respond to those action frames or may be configured to report the action frames to operating system 320 depending on whether functional module 394C is programmed to respond to them.

Similarly, if computing device 310 is configured for the role of a client in a group, packets relating to communication with devices in that group will be identified with a MAC address that causes multiplexer/demultiplexer 392 to route those packets to a port configured as a client, such as port 390. Port 390 may be associated with functional module 394E, implementing functionality of a client according to a peer-to-peer protocol. Functional module 394E may be configured to transfer data from data frames in such packets to memory and notify operating system 320 of that data, using techniques as are known in the art. Functional module 394E may respond to packets containing action frames or may notify operating system 320 of those management frames.

Functional modules 394C, 394D and 394E may be coded to implement functions prescribed in accordance with a peer-to-peer protocol, such as Wi-Fi Direct protocol. Additionally, functions performed by a device operating in accordance with the peer-to-peer protocol may include detecting a remote device with which a persistent peer-to-peer group was previously formed. Upon detecting such a remote device, functions performed by the device may include establishing communication with that remote device based on previously stored persistent profile information. These functions may be implemented by appropriately configuring functional module 394C. Though, any suitable implementation may be used.

FIG. 3 illustrates a specific hierarchy of communication functions. Certain functions relating to communication with external devices are performed within radio 354. Other functions are performed within driver 344. Yet further functions are performed within operating system 320. Though not specifically illustrated, even further functions may be performed by applications 220 (FIG. 2) or by input from a user or source external to computing device 310. With such an architecture, higher level functions, such as determining which devices to connect to as part of a peer-to-peer group, may be performed at higher levels in the architecture. Conversely, lower level functions, such as generating an acknowledgement to a received packet may be performed at lower levels in the architecture. For example, driver 344 may be configured to generate such an acknowledgement. Any of the functions as described herein may be performed by components at any suitable level of the hierarchy.

Though other architectures are possible that may partition the functions differently so that different aspects of communication are controlled by different components, in the example illustrated, radio 354 and driver 344 are configured to respond statelessly to events, such as commands or received packets. To the extent state information is involved in a communication session, that state information may be maintained within operating system 320. For example, stack 322 may maintain state information for communication sessions carried on through any of the ports 382, 384, 386, 388 and 390. The specific state information maintained may depend on the number and types of states within a protocol supported by each of the ports.

In the example of FIG. 3, session state information 324A is shown associated with port 388. Though not expressly illustrated, session state information may be maintained for other ports. Depending on the protocol implemented by port 388, such session state information may indicate parameters of a session, such as a number of devices that are joined in a group for which computing device 310 is the group owner. Other state information, such as a time until those devices may enter a lower power mode, may also be stored as part of the session state information 324.

FIG. 3 additionally shows session state information 324B and 324C associated with port 388. State information 324B and 324C may describe different sessions. Such sessions may arise if computing device 310 is joined in three groups in which it is the group owner. To support multiple such sessions, a mechanism may be provided to associate specific frames sent or received with a corresponding session. Any suitable identifier or identifiers may be used. For example, communications with a group of devices may be regarded as a session, such that an identifier of a group may be used to aggregate related communications as part of a session. Stack 322 provides an interface to device manager 330 or other components that associates each session with the appropriate component that is an end point in that session. Such interfacing may be performed using techniques as are known in the art.

In addition to maintaining state information that allows communications from separate sessions to be presented appropriately, stack 322 may maintain, as part of the state information maintained for each session, information that allows stack 322 to relate communications that are part of an exchange of communications to perform a function. For example, when a frame, representing a request, is sent, recognizing that a subsequently received frame is a response to that request may facilitate processing of the request and response. Providing a mechanism to relate communications that are part of an exchange may facilitate processing, particularly if multiple sessions are supported on the same port. To enable recognition of communications that are part of an exchange, "dialog tokens" may be used. A communication initiating an exchange may be tagged with such a dialog token. Upon responding to such a communication, the dialog token from the request may be copied to the response. Accordingly, a device sending a request may associate a response, or any other communication that is part of the same exchange, with the request. Accordingly, state information 324A may contain dialog tokens associated with ongoing communications involving any device communicating as part of the session.

Dialog tokens may be generated in any suitable way. They may be generated, for example, within the operating system 320. Alternatively, if a packet beginning a dialog is initiated in a port, the port or other component within driver 344 may generate the token. Similarly, if a reply to a packet is generated within a port, such as port 386, 388 or 390, the token may be inserted in the reply by that port. Conversely, if a reply to a packet is initiated in response to a command generated within operating system 320, a component within operating system 320, such as stack 322 may specify the token for inclusion in the reply. Table I indicates, for the listed action frames, whether the dialog token associated with an action frame is generated in the operating system or, if not, in the driver. Though, it should be appreciated that Table I represents only one example of how the functionality of generating a dialog token for a frame may be partitioned, and any suitable partitioning of that function may be used.

Similar session state information 326A, 326B and 326C is shown in connection with port 390. Session state information 326A, 326B and 326C may represent state maintained for each of three sessions, with each session being associated with a group in which computing device 310 is a member with the role of client. As with session state information 324A, 324B and 324C a unique dialog token may be associated with each of the sessions, allowing stack 322 to separate received packets associated with each of the sessions. Likewise, computing device 310 may cause a dialog token to be associated with packets transmitted from computing device 310. The dialog tokens may be used to allow stack 322, or similar processing components on remote devices that receive packets from computing device 310, to associate packets that are part of a multi-packet exchange of information. For example, a second packet sent in reply to a first packet may include the token from the first packet. As a result, when the sender of the first packet receives the second packet, it can associate the first packet and second packet with the same dialog.

With the architecture illustrated in FIG. 3, state information concerning each of the connections may be maintained within operating system 320. As a result, the ports 386, 388 and 390 need not maintain state information. In some embodiments, functional modules, such as functional modules 394C, 394D and 394E, that implement the functions of a port do not maintain state information. Rather, each of the functional modules may be encoded to respond to events, such as a command from operating system 320 or a received packet passed on by radio 354. Though, regardless of how this functionality is partitioned, computing device 310 may be controlled to supply functionality associated with multiple entities by establishing and configuring a port to perform the functionality of each entity. As a result, computing device 310, because driver 344 and radio 354 may be configured to support multiple ports, may concurrently operate as different entities. These entities may include entities associated with infrastructure mode communication as well as entity associated with peer-to peer communication.

Regardless of how a computing device is architected, the device may implement functions defined in an infrastructure mode protocol and/or a peer-to-peer protocol. Functions performed by a device operating in accordance with a peer-to-peer protocol may include forming a group of two or more devices for peer-to-peer communication. One aspect of forming a group may include selecting a device of the group to perform functions associated with control of the group. Such functions, for example, may include determining which devices are allowed to join the group, providing an identifier for the group and providing addresses for devices within the group. In the example embodiment described herein, such a device may be a group owner. Other devices that are part of the group may be clients of the group owner.

Another aspect of forming a group may be determining whether the group is to be a persistent group. Whether a group is to be a persistent group may be determined based on information exchanged between devices, or in any suitable way. If the group is persistent, forming a group may entail creating and storing a persistent group profile. In some embodiments, an identifier of a user may be stored in association with the persistent group profile.

During formation of a persistent group, or at any time thereafter, devices in the group may be designated as a set of related devices that should be requested to re-form a group concurrently. The devices to be triggered to concurrently re-join a group may be determined in any suitable way. In some embodiments, a set of devices may be joined in a group because those devices will be used together and therefore may be triggered to concurrently re-form the group. In such an embodiment, the set of devices that is triggered to concurrently re-form a group may be co-extensive with the group. In other embodiments, a set of devices to be triggered to concurrently re-form a group may be a subset of a previously defined group. In such an embodiment, a mechanism may be provided to select devices for that set. Once such a set is selected, the set may be used to re-form a group that contains at least the selected devices.

Figure 4:
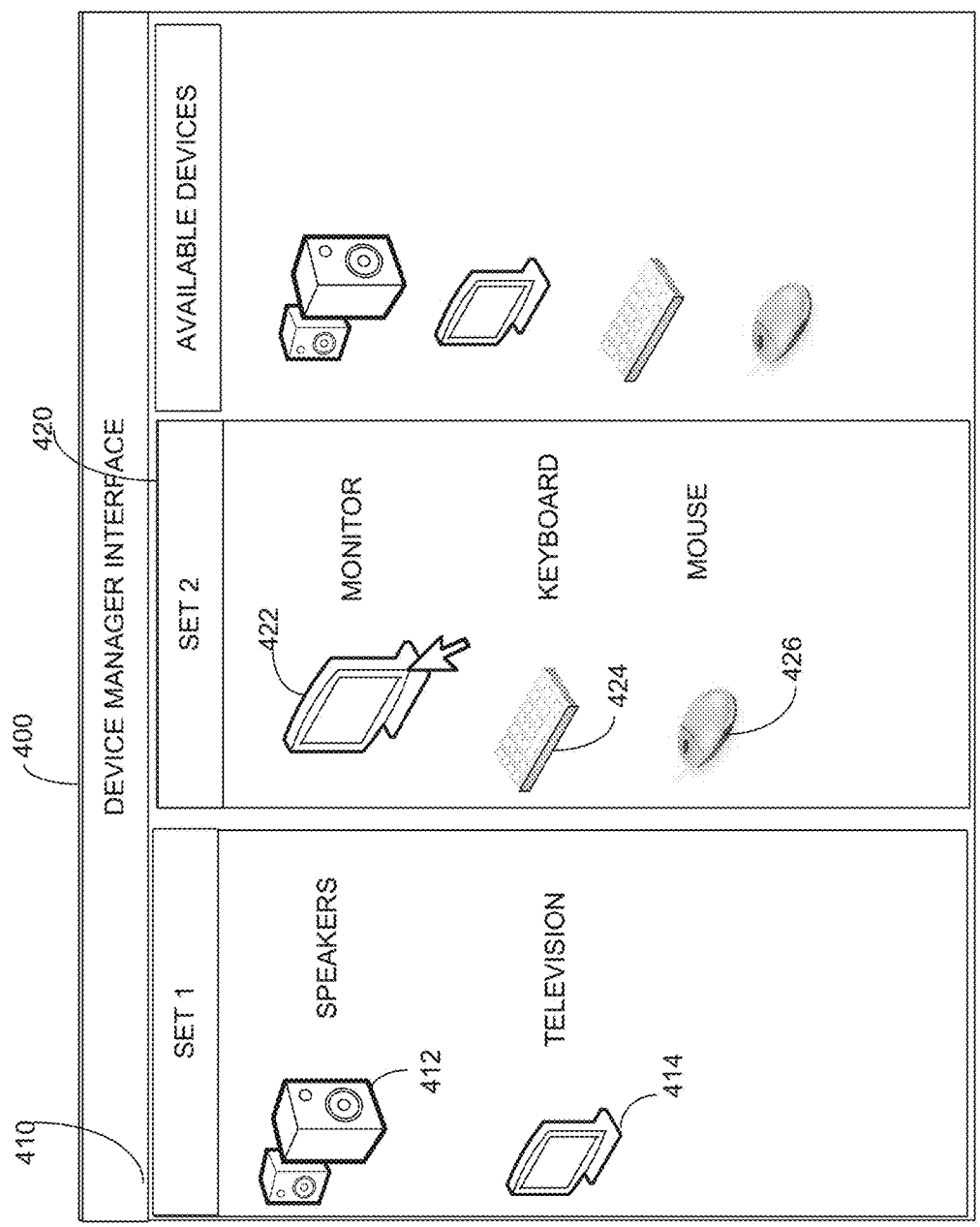
FIG. 4 is a sketch of an exemplary user interface through which a user may designate a set of devices to be concurrently requested to re-form a peer-to-peer group.

Any suitable mechanism may be used to select a set of devices. FIG. 4 illustrates a mechanism by which a set of devices may be selected. FIG. 4 illustrates a user interface 400. User interface 400 may be rendered on a display of a wireless device. For example, device manager 330 may control computing device 310 such that an interface in the form of interface 400 is rendered on a display (not shown) of computing device 310. Device manager 330 may use information input by a user through user interface 400 in any suitable way. For example, it may use the inputs to establish a group containing the selected devices. Alternatively or additionally, it may use the user inputs to generate appropriate messages that will trigger the selected devices to concurrently re-form a group.

Any suitable user interface format may be used to receive user inputs specifying selections for devices in a set. In this example, user interface 400 is a graphical user interface through which a user may supply inputs using a mouse or other pointing device in accordance with known graphical user interface techniques. In this example, user interface 400 has multiple display areas through which a user may specify devices to be part of one or more sets. In the illustrated example, display area 410 may be used to specify devices belonging to a first set. Display area 420 may have a similar function, allowing a user to specify devices belonging to a second set. Display area 430 may contain a representation of devices that a user may assign to one or more sets.

In operation, the device manager 330 may identify devices for representation in display area 430 by receiving communications from wireless devices in the vicinity of computing device 310 that are available for connection in accordance with a peer-to-peer protocol. Such communications may be initiated by remote devices or may be transmitted in response to messages transmitted by computing device 310. Accordingly, it should be appreciated that the specific mechanisms by which available devices are identified are not crucial to the invention, and available devices may be identified in any suitable way, including using techniques as are known in the art. Regardless of how the available devices are identified, device manager 330 may render a representation of those devices in display area 430.

To specify a set, a user may select devices, based on the representations of those devices appearing in display area 430, and specify a set with which the selected device is to be associated. In the specific example illustrated in FIG. 4, a drop and drag user interface technique may be used. With such an interface technique, a user may select a device by manipulating a mouse or other pointing device to select an icon representing the device from display area 430 and drag that icon to a display area 410 or 420 associated with a set. By "dropping" the icon in the display area associated with a set, the user may specify the assignment of a selected device to a set. As a concrete example, in the scenario illustrated in FIG. 4, the user has placed an icon 154 for speakers in a set represented by display area 410. The set represented by display area 410 also includes a television, as represented by icon 414. Similarly, the user has specified a second set by placing icons of available devices in display area 420. In this case, the display area 420 includes icon 422, representing a monitor, icon 424, representing a keyboard, and icon 426, representing a mouse. In the example illustrated, each set is assumed to contain the wireless device displaying user interface 400. Though, it is not a requirement of the invention that a set be specified in this way.

It should be appreciated that FIG. 4 is a schematic illustration of a user interface through which a user may provide information about sets of devices to be used together. A user interface may be configured to alternatively or additionally receive other information. For example, user interface 400 may be used to receive a friendly name or other designator of a set of devices. Further, user interface 400 may be configured to receive user inputs designating events or scenarios that may trigger formation or re-formation of connections to the devices designated as a set.

Further, it should be appreciated that any suitable mechanism may be used to select devices that form a set. In some embodiments, the devices forming a set may be selected by device manager 330 or other component executing on a wireless device. For example, device manager 330 may be programmed to recognize that speakers and a television, when existing in the same location, may form a portion of an entertainment system such that they are automatically assigned to the same set of devices. Similarly, devices constituting a monitor, keyboard and mouse may be automatically recognized as being functionally related as part of a work station. Accordingly, an assignment of available devices to sets may be partially or totally automated. For example, user interface 400 may represent sets of devices automatically formed by device manager 330. The device manager may then present the automatically selected sets through user interface 400 to allow the user to accept, delete or modify the sets as proposed.

Information used by device manager 330 to automatically form sets may be acquired in any suitable way. For example, some devices may supply metadata as part of wireless communication to identify their functionality. Other devices may supply device identifiers or other information that may be used to access metadata about the device functions. In the example of FIG. 1A, computing device 110 may receive metadata from remote devices, such as camera 130 and printer 134. Computing device 110 may then access, over another network connection, information based on the device identifiers. In the scenario illustrated in FIG. 1A, computing device 110, for example, may download metadata about remote devices from server 140.

Regardless of the manner in which the sets of devices are specified, the sets may be used in any suitable way. For example, the device manager 330 may use such information to form a group that contains the selected devices. In this way, the devices to be triggered to concurrently re-form a group may be designated using the group identifier. In other scenarios, when the set of selected devices constitutes only a portion of a group, the set may be provided with an identifier separate from an identifier for the group. The device manager may communicate the set identifier to the devices in the set such that they can recognize and respond to an invitation request directed to the devices in the set, collectively. Communication of the set identifier may occur either as part of group formation or at any time thereafter.

Regardless of when a set of devices to concurrently re-form a group is designated, any wireless device may trigger those devices to concurrently re-form a group, such that communications among those devices may occur in accordance with the peer-to-peer protocol for the group. In the scenarios illustrated in FIGS. 1A and 1B, a user, such as user 112 or user 152, is interacting with a computing device, such as computing device 110 or computing device 150. Moreover, in the scenarios illustrated in FIGS. 1A and 1B, the computing device may be selected as a group owner for a peer-to-peer group as part of a negotiation performed during group formation. Further, the computing devices, such as computing devices 110 or 150, may receive further user input indicating a user intent to re-establish communication among a designated set of devices. In such a scenario, a device acting as a group controller may trigger remote devices to concurrently re-form the group by triggering each of the devices to re-join the group.

Figure 5:
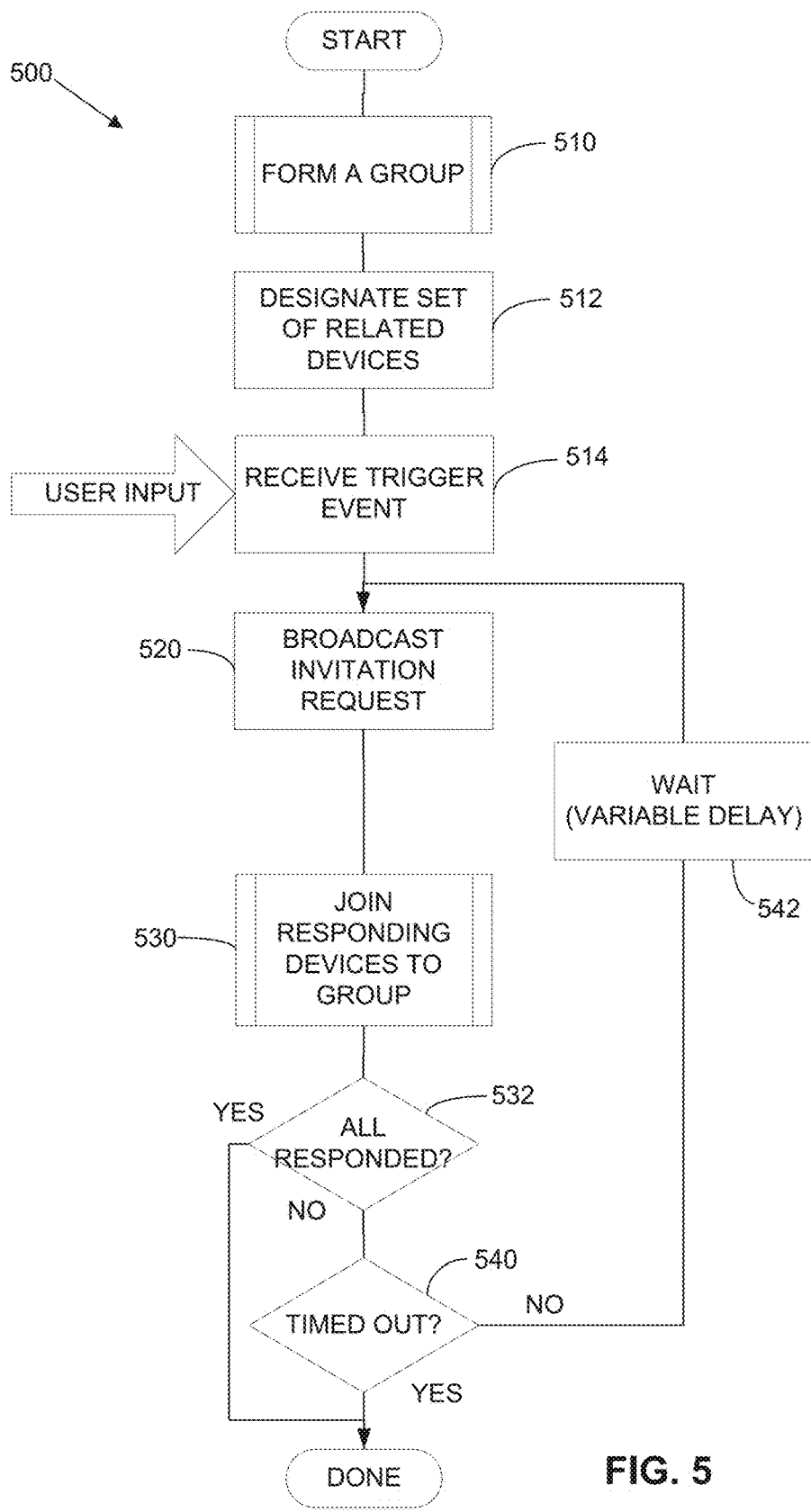
FIG. 5 is a flowchart of an exemplary method of operating a wireless device to concurrently trigger a plurality of remote devices to re-join a group.

FIG. 5 illustrates an example method of operation of a wireless device, configured as a group owner, that triggers multiple remote devices to concurrently re-join a group. However, it should be appreciated that it is not a requirement of the invention that a group owner trigger multiple devices to concurrently re-form a group. In some embodiments, a device configured as a client in a peer-to-peer group may initiate the process of concurrent group re-formation. In yet other embodiments, a device that is not a member of the group may trigger concurrent action of multiple devices to re-form a group. Accordingly, it should be appreciated that FIG. 5 is illustrative rather than limiting.

The process of FIG. 5 begins with subprocess 510. In subprocess 510, multiple devices may interact to form a group. Processing within subprocess 510 may be performed in any suitable way. As one example, subprocess 510 may entail receiving user input, such as user input designating devices to include in the group or one or more passwords or PINs to enable connections between the devices or other suitable inputs. Processing at subprocess 510 may also entail exchanging wireless communications between the devices to be joined in a group. The wireless communications may occur in accordance with any suitable protocol. As one example, the devices may communicate in accordance with the Wi-Fi Direct protocol. As part of communications in accordance with this protocol, the devices may select a group owner, which may then communicate to other devices in the group a group identifier and other provisioning information that enables the devices to communicate as a group in accordance with the protocol.

Regardless of the nature of information generated or exchanged as part of subprocess 510, execution of subprocess 510 may result in generation of a group profile. This group profile may be stored on each of the wireless devices in the group such that it may later be used for re-forming the group.

Regardless of the manner in which the group is formed as part of subprocess 510, processing may proceed to block 512. At block 512, a set of related devices may be designated. Any suitable actions may be performed at block 512 to designate a set of related devices. For example, processing at block 512 may entail receiving user input through user interface 400. Though, any of the techniques described above, or any other suitable technique, may be used to designate a set of related devices. Once the set of devices is selected, an identifier for the set may be generated and this identifier may be made known to the devices in the set in any suitable way. For example, the set identifier may be communicated wirelessly to each remote device in the set.

It should be appreciated that processing at block 512 may be regarded as optional. In some embodiments, no special action to designate a set of devices may be used. Rather, in some embodiments, whenever communication is established with a device that is part of a group, all devices in the group may be triggered to concurrently re-form the group. In such an embodiment, designating a set of devices separate from forming the group may be omitted. In yet other embodiments, the processing at block 512 may precede subprocess 510. In such an embodiment, designation of a set of related devices may be used as a basis for forming a group of devices as in subprocess 510.

Regardless of the manner in which a set of devices to be triggered to concurrently re-form a group is determined, processing may proceed to block 514. Processing at block 514 may be performed at some time after the group is formed as part of subprocess 510. In the example of FIG. 5, processing at block 514 occurs when some or all of the devices joined in the group as a result of subprocess 510 are not actively joined to the group. Such a state may be created by one or more of the devices in the group entering a low power sleep state, being turned off, being moved out of communication range or as a result of other actions, such as express user input into one or more of the devices. Accordingly, at block 514, a device, in this example the device operating as the group owner, may receive a trigger event. The trigger event may indicate that communication with the designated set of related devices is to be re-established.

Any suitable trigger event may be received at block 514. In this example, the trigger event is indicated as receipt of user input indicating user intent to communicate with devices in the set. Such input, for example, may be express input. For example, user input may be received through a user interface, such as user interface 400. Such user input may access a command to a device manager within a wireless computing device to form connections with designated devices in a specified set. Alternatively, the user input may be input specifying a command or function that, in order to be completed, entails communication with devices in the designated set of related devices. Such a command, for example, could be a command to stream multimedia content to devices forming an entertainment system.

Regardless of the trigger event received at block 514, processing may proceed to block 520. At block 520, the wireless device executing process 500 may trigger other devices to re-form the group formed in subprocess 510 such that communications may occur among those devices. In this example, other devices that are part of the group are triggered to re-form the group by broadcasting a message formatted as an invitation request. The invitation request may be formatted in such a way that each of the devices in the designated set recognizes the invitation request as an indication that the device is to attempt to re-join the group.

In the example of FIG. 5, the wireless device executing process 500 was designated as the group owner of the group formed in subprocess 510. Accordingly, when other devices in the group respond to the invitation request, they may respond by sending a request to the device executing process 500 to join the group. Accordingly, process 500 proceeds to subprocess 530 where the wireless device joins to the group any remote devices responding to the invitation request broadcast a block 520.

Subprocess 530 may be performed in accordance with the peer-to-peer protocol used to initially form the group at block 510. As part of subprocess 530, the wireless device and each responding remote device may exchange one or more messages in order to re-establish communication. Those messages may be exchanged based on information stored in the persistent device stores of the devices as part of subprocess 510. Though, the specific protocol by which a responding device is re-joined to the group is not critical to the invention.

Once the responses to the invitation request broadcast at block 520 have been processed, process 500 may proceed to decision block 532. At decision block 532, the process may branch, depending on whether all of the devices in the set designated at block 512 have responded. If so, the process may branch from decision block 532 and end with the designated devices joined in a group such that communication may occur among those devices in accordance with the peer-to-peer protocol.

Conversely, if all of the devices have not responded, process 500 may branch from decision block 532 to decision block 540. This branch may be taken for example, if one or more devices in the designated set are in a low powered sleep mode at the time of the transmission of the invitation request at block 520. Other scenarios may also cause process 500 to branch from decision block 532 to decision block 540. For example, if multiple devices respond simultaneously to the invitation request, their responses may interfere with each other, preventing either response from being received.

If processing reaches decision block 540, all of the designated devices have not re-joined the group. Accordingly, process 500 may loop back from decision block 540 for a further attempt to communicate with the devices for which no response was received. To preclude extensive time from being spent attempting to communicate with devices that may not be available or configured to respond, the process may eventually time out. Accordingly, processing at decision block 540 may entail determining whether the number of invitation requests transmitted has exceeded a threshold or the amount of time spent attempting to contact remote devices has exceeded some threshold. If not, process 500 may loop back from decision block 540 to block 542.

At block 542, process 500 may wait to proceed to block 520 where a further invitation request is to be transmitted. The wait time at block 542 may be selected in any suitable way. In the example illustrated in FIG. 5, the wait time at block 542 may be variable and may be selected such that invitation requests are not transmitted at a periodic rate or are otherwise transmitted in accordance with a pattern that increases the likelihood that a remote device being operated in a mode in which it can detect other devices will quickly receive an invitation request.

Regardless of the manner in which limits are imposed on the number of iterations within process 500, once those limits are exceeded, processing may branch from decision block 540 to the end of process 500. Thereafter, operation of the computing device executing process 500 may continue based on communications with the devices in the designated set with which communication could be established. This processing may include performing functions that involve exchanging data with or among the devices in the set. Though, in embodiments in which communications with a sufficient number of devices in the set could not be established, such further processing may entail error handling or other actions.

The invitation request sent at block 520 may have any suitable format. In some embodiments, the invitation request may be formatted as an action frame in accordance with a peer-to-peer protocol. Though, the invitation request may be a wireless communication formatted in any suitable way. FIGS. 6A, 6B, 6C and 6D illustrate schematically examples of suitable wireless communication formats.

Figure 6A:
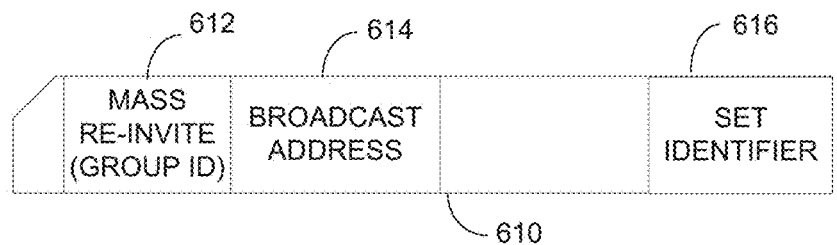
FIGS. 6A, 6B, 6C and 6D are schematic illustrations of exemplary invitation requests.

FIG. 6A illustrates a message 610. Message 610 is here shown containing multiple fields. In this example, field 612 contains a value identifying message 610 as a "mass re-invite" message. In this example, field 612 contains a value, signifying to recipients of message 610 that the sender of message 610 is requesting that multiple devices in a designated set concurrently re-form a group. Though, it should be appreciated that, in accordance with embodiments of the invention, each device receiving a message, such as message 610, need not respond differently based on the number of other devices being concurrently invited to re-join a group. Accordingly, the value in field 612 may be a value conventionally used in an invitation request addressed to a single device. Upon receipt of such a message, a receiving device, other than determining whether it is being directed to re-join a group, may respond to the message using techniques as is known in the art.

The value in field 612, in addition to signifying that devices to which the message is directed are to re-form a group, may include a value identifying that group. As one example, a portion of the value in field 612 may be the group identifier, generated as described above or in any other suitable way. A recipient of message 610 may use this information to select a group profile from a persistent profile store such that it has access to information useful when re-forming the group.

In this example, message 610 includes a field 616 that contains a value identifying a set of devices intended to respond to message 610. In scenarios in which the set of devices to concurrently re-form a group constitutes the entire group, the value in field 616 may be a group identifier as described above. In scenarios in which a subset of a group has been designated, the value in field 616 may be an identifier that is different than the group identifier. However, the specific source of the identifier stored in field 616 is not critical to the invention, and any suitable identifier recognized by the designated devices may be used.

In the example of FIG. 6A, message 610 includes an address field 614. In this scenario, field 614 includes a value indicating that message 610 is a broadcast message. Such a value may trigger any remote device receiving message 610 to process it. Though, processing message 610 may entail determining whether the receiving remote device is configured to respond to messages of the mass re-invite type and, if so, checking whether the remote device is a member of the set identified by the value in field 616. If not processing message 610 may entail taking no action. Though, if so, processing message 610 may entail taking action to re-join the designated group.

Figure 6B:
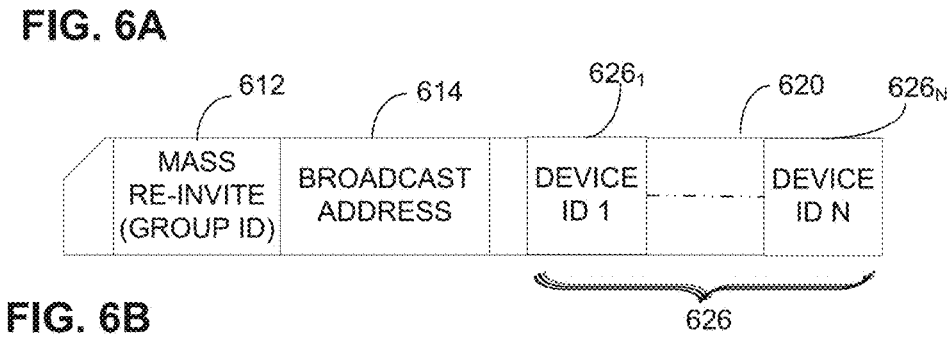

FIG. 6A is just one example of a suitable message format that may be used in some embodiments. FIG. 6B illustrates a message 620 with an alternative format. Message 620, like message 610, includes a broadcast address in field 614 and a value in field 612 indicating that message 620 is a mass re-invite message for a particular group. Message 620 includes a portion 626 that identifies remote devices intended to respond to the mass re-invite message by concurrently attempting to re-form a group. In this example, portion 626 contains fields $626_1 \ldots 626_N$, each identifying a device in the designated set. A message formatted as in FIG. 6B may be used in embodiments in which a separate identifier for a subset of devices in a group is not generated.

Figure 6C:
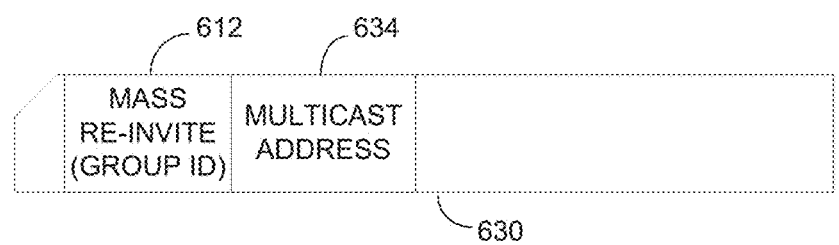

FIG. 6C illustrates yet a further possible embodiment of an invitation request. In this example, message 630 includes field 612 which, as described above, signifies to recipients of the message that the sender is requesting multiple devices to re-form a designated group. Here, message 630 is a multi-cast message, with a value in field 634 serving as a multicast address. The multicast address is formatted in such a way that multiple devices associated with that multicast address will process message 630. In the embodiment illustrated, the multicast address in field 634 may be selected to correspond to the devices in a designated set such that the multi-cast address implicitly identifies a set. In this way, each of the devices in the designated set will attempt to re-join the group in response to receipt of an invitation request in the form of message 630.

Figure 6D:
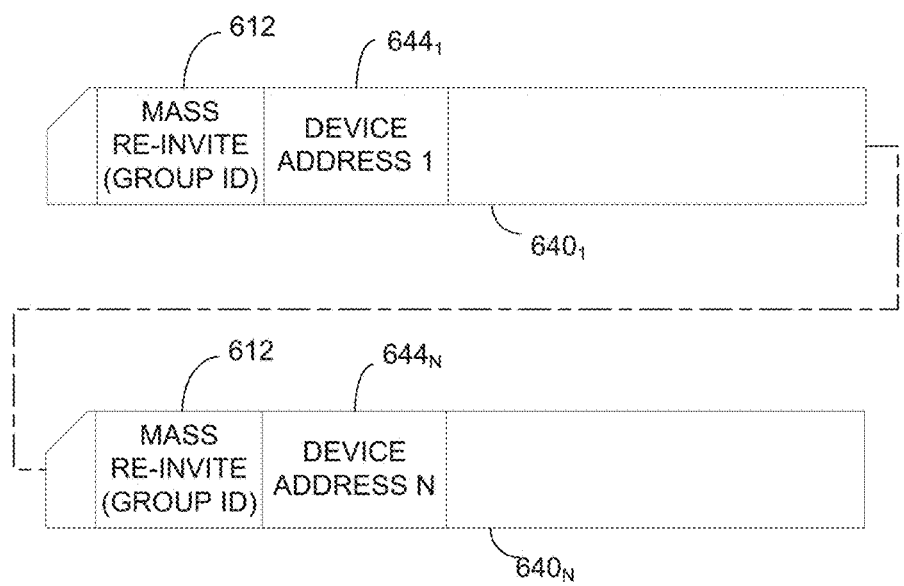

FIG. 6D illustrates a further embodiment of an invitation request. In this example, the invitation request is transmitted as a block of messages $640_1 \ldots 640_N$. In this example, each of the messages $640_1 \ldots 640_N$ is addressed to one of the devices designated in a set. Accordingly, message $640_1$ includes a field $644_1$ including an address for a first device in this set. Message $640_N$ includes a field $644_N$ containing a value representing an address for device N. In this way, each of the devices in the set may respond to a separate message addressed to it. However, in the embodiment illustrated, the messages $640_1 \ldots 640_N$ may be transmitted sequentially in a block such that the devices may concurrently respond to the invitation requests.

Each of the messages $640_1 \ldots 640_N$ includes a field 612, identifying the message as an invitation request. The value in field 612 may indicate a group for the device receiving and processing a message to re-join. The value in field 612 may be the same as in fields 612 for messages 610, 620 and 620. Though, it should be appreciated that the values in field 612 may be different in different embodiments.

In the embodiments illustrated, each of messages 610, 620, 630 and $640_1 \ldots 640_N$ is shown to contain the same values in field 612. However, in some embodiments, different message formats may have different values in a field signifying a desired action upon receipt of the message. For example, broadcast messages 610 and 620 contain additional information about which devices processing the broadcast message should respond by attempting to re-join a group. Messages 630 and $640_1 \ldots 640_N$ that contain an addressing mechanism that inherently identifies devices intended to respond to the message by attempting to re-join a group could contain different values in field 612. For example, the values in message 630 and 640$_1$ . . . 640$_N$ could be values as in an invitation request in a conventional peer-to-peer protocol. In such a scenario, the devices receiving messages formatted as 630 and 640$_1$ . . . 640$_N$ need not be specially configured to concurrently re-form a group along with other devices.

Figure 7:
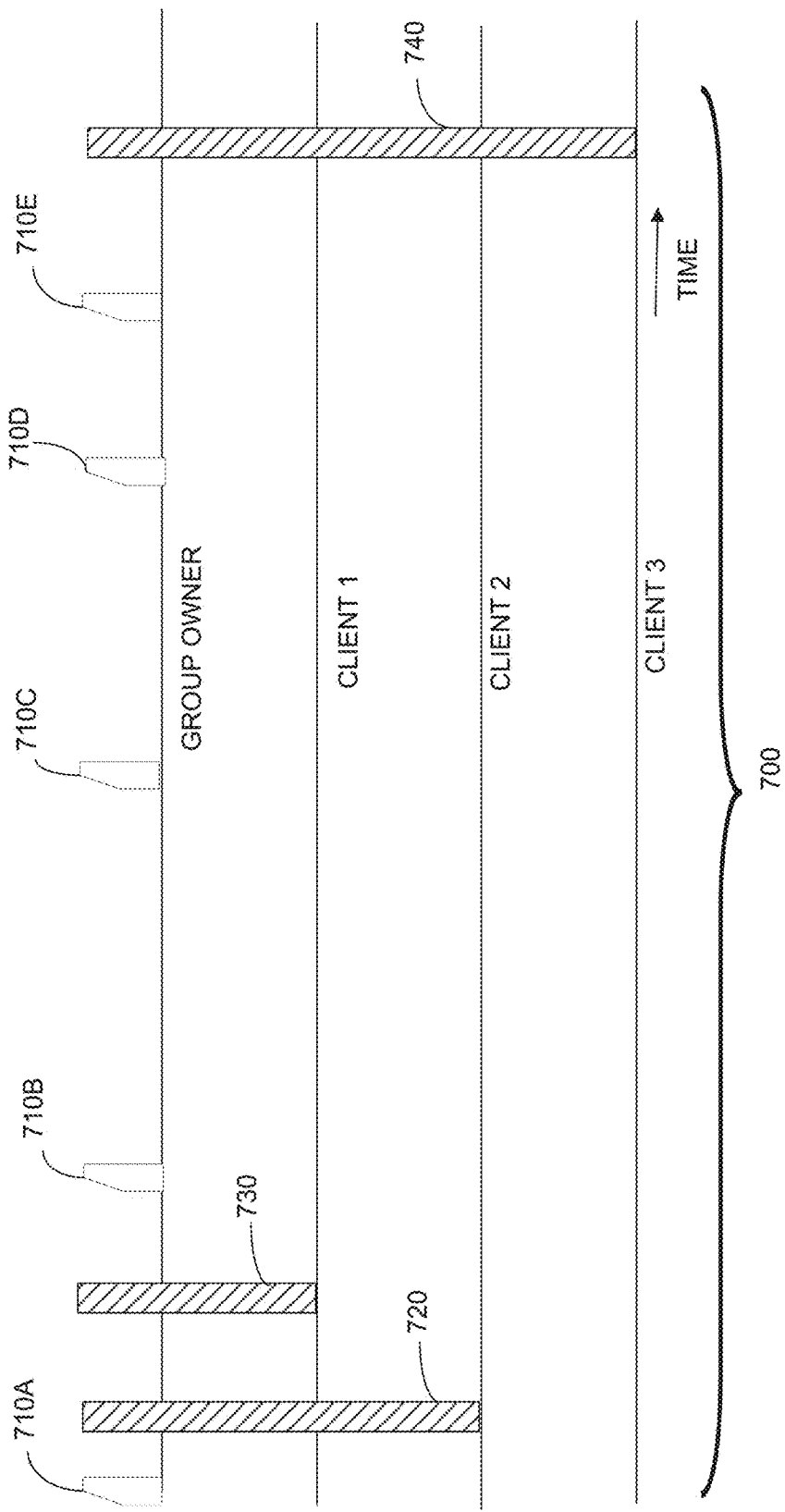
FIG. 7 is a chart illustrating an interval during which a plurality of client devices concurrently re-join a peer-to-peer group.

Regardless of the specific format of the messages used, transmission of a message acting as an invitation request to a designated set of devices may start an interval during which the devices in the set concurrently re-form a group such that with or among the devices in that group may occur. FIG. 7 schematically illustrates such an interval during which multiple devices in a set concurrently re-form a group.

FIG. 7 illustrates that a device, here operating as a group owner, transmits invitation requests at various times. Invitation requests 710A, 710B, 710C, 710D and 710E are illustrated. The invitation requests 710A . . . 710E may be in any suitable format, including in any of the formats illustrated in FIGS. 6A . . . 6D. As can be seen in FIG. 7, the invitation request 710A . . . 710E are spaced by variable amounts. This spacing may be selected such that, if a remote device is exiting a low power sleep state from time to time, the time at which the remote device is awake and available to receive an invitation request will coincide with a time at which the group owner is transmitting an invitation request. Any suitable technique may be used to select the intervals between transmission of invitation requests.

FIG. 7 illustrates that the devices in the designated set may respond to an invitation request as any time within interval 700 and in any order. In this example, three devices, remote from the wireless device operating as the group owner, are in the set of designated devices. Those devices are designated Client 1, Client 2 and Client 3.

In the scenario illustrated in FIG. 7, Client 2 responds first to an invitation request broadcast by the group owner. In this example, Client 2 responds first to invitation request 710A. As a result, Client 2 is shown engaging in interactions 720 with group owner following transmission of invitation request 710A. While these interactions 720 are being performed, the invitation request 710A is outstanding for Client device 1 and Client device 3.

In this example, Client device 1 also responds to invitation request 710A. This response is illustrated as interactions 730. Interactions 730 are also shown occurring in response to invitation request 710A. In this example, both Client 1 and Client 2 respond to invitation request 710A. Such a scenario may occur, for example, if both Client 1 and Client 2 are not in a low power state and are therefore able to receive and respond to invitation request 710A. Though, as illustrated, Client 1 and Client 2 both respond to invitation request 710A, they respond at different times. Such a response pattern may indicate that Client 1 and Client 2 are using a contention resolution mechanism to avoid transmitting simultaneously.

FIG. 7 illustrates that Client 3 does not response to invitation request 710A. Accordingly, the group owner may transmit further invitation requests, represented as invitation request 710B, 710C, 710D and 710E. In the scenario illustrated, Client 3 does not respond to invitation request 710A . . . 710D. Such a response pattern may indicate that Client 3 is in a low powered state during transmission of invitation requests 710A . . . 710D. Though, such a response pattern may also be the result of other conditions that precluded Client 3 from responding to invitation requests 710A . . . 710D. For example, Client 3 may have been configured to not respond to invitation requests, may have been performing other operations, including listening for communications on channels other than a channel on which invitation requests 710A . . . 710D were transmitted, that precluded Client 3 either from receiving or responding to invitation requests 710A . . . 710D. Nonetheless, FIG. 7 indicates that Client 3 ultimately receives and responds to invitation request 710E, leading to interactions 740. Upon completion of the interval 700, each of the client devices has interacted with the group owner to re-join the group. Thereafter, communications with or among the designated set of devices may occur.

Figure 8:
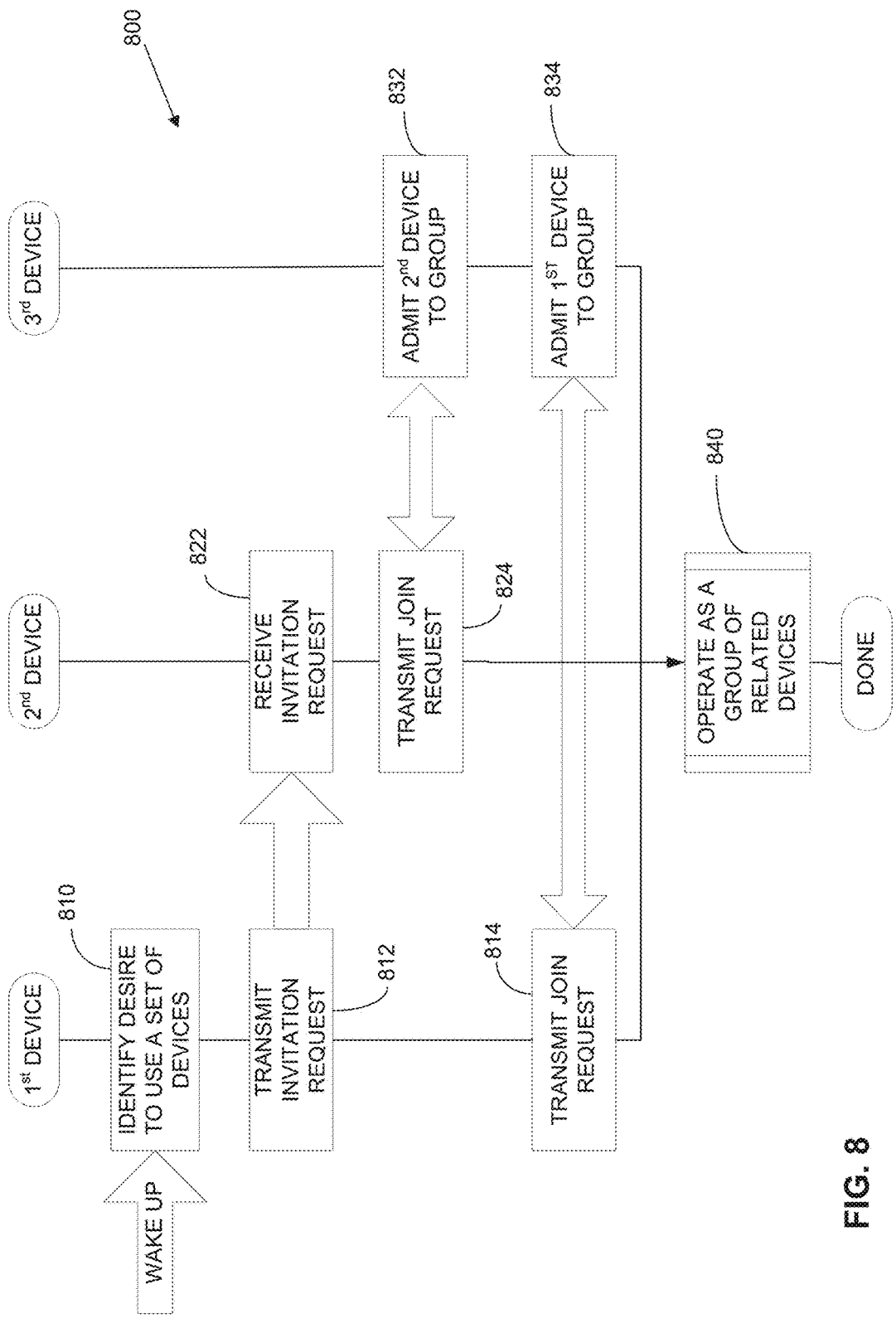
FIG. 8 is a flowchart of a method of operation of a system having multiple wireless devices that may concurrently re-form a peer-to-peer group.

In the scenario illustrated in FIG. 7, re-formation of a group was triggered by a device designated as a group owner for that group sending invitation requests. It is not a requirement of the invention that re-formation of a group be triggered by the group owner. FIG. 8 illustrates a method of operation of a system containing multiple devices in which re-formation of a group is triggered by a device other than the group owner. In the example of FIG. 8, a first device and a second device have been configured as clients. A third device has been configured as a group owner.

In the example of FIG. 8, one of the devices operating as a client device may trigger re-formation of a group. Accordingly, method 800 may begin at block 810 where the first device identifies a scenario in which a user may desire to use a set of wireless devices. The first device may be programmed to identify such a scenario in any suitable way. Such a determination may be made in response to detection of one or more events.

In the example of FIG. 8, processing at block 810 may be performed as part of the first device waking up from a low power sleep state. The first device, for example, may be a television that is part of an entertainment system. The television maybe configured to wake up from a low powered sleep state upon user input, such as a user pressing a power on button. The first device may be configured as part of an entertainment system that includes the second device. The second device, for example, may be a speaker or other device that may present to a user streaming audio information. The first device and second device may be configured to operate with a third device, such as a wireless computing device that may serve as a source of streaming audio and video information. Accordingly, when the first device receives users input indicating that the first device should be powered up, the first device may infer user intent to operate the first device, second device and third device, such that wireless communications may be exchanged between or among devices of that set.

Accordingly, processing may proceed from block 810 to block 812 where the first device triggers re-formation of a group that includes the first device, the second device and third device. At block 812, the first device may transmit an invitation request. Such a message may signify to each recipient what group to re-join. The invitation request transmitted at block 812 may be in the form of an invitation request as illustrated in any of FIG. 6A . . . FIG. 6D. However, any suitable form of an invitation request may be sent at block 812.

Regardless of the form of invitation request transmitted at block 812, other devices in the vicinity of the first device may receive and, if appropriate, respond to the invitation request. In the scenario illustrated in FIG. 8, the second device receives the invitation request at block 822. The second device may recognize from information included in the information request that the second device is a member of a group to be re-formed.

Accordingly, processing may proceed from block 822 to block 824 where the second device takes actions to re-join the designated group. At block 824, the second device may transmit a join request. In this case, the join request may be directed to the third device, which was previously established as the group owner for the designated group. The join request transmitted at block 824 may be formatted in accordance with the Wi-Fi Direct protocol or formatted in any other suitable way. The information contained in the join request may be based on information stored in a persistent group profile associated with the second device.

Method 800 may proceed to processing performed on the third device. In the illustrated scenario, the third device is operating as a group owner. Accordingly, the third device may receive and respond to the join request transmitted by the second device at block 824. In this example, the third device responds to the join request at block 832 by admitting the second device to the group that is being re-formed. Processing at blocks 824 and 832 may entail an exchange of wireless communications that establish a connection between the second device and the third device. These communications may be based on information stored in persistent group profiles on the second and third devices and may be formatted in accordance with the peer-to-peer protocol initially used to form the group that is being re-formed. Though, regardless of the specific actions as blocks 824 and 832, the result may be that a connection is established between the second device and the third device such that those devices may communicate as part of the re-formed group.

Though the first device initiated the process of re-forming the group, in the scenario illustrated in which the first device is a group client, the first device also must re-join the group. Accordingly, process 800 may also include processing at block 814, which may be performed on the first device. At block 814, the first device may also transmit a join request. The join request transmitted at block 814, like the join request transmitted at block 824, may be based on information stored as part of a persistent group profile. The join request may be directed to the third device operating as the group owner. Accordingly, process 800 may include further processing on the third device. At block 834, the third device may receive and respond to the join request transmitted by the first device at block 814.

Similarly to the processing at block 832, processing at block 834 may entail an exchange of communications that results in the first device being re-joined to the group as a client such that the first device, second device and third device may communicate wirelessly as a group of related devices. Process 800 may then proceed to sub-process 840 where the first device, second device and third device operate as a group of related devices.

The specific actions taken at sub-process 840 are not critical to the invention. The actions, for example, may depend on the nature of the devices. In the example in which the devices form a part of a multi-media entertainment system, sub-process 840 may entail one of those devices streaming multi-media content to the other devices for presentation as audio and/or video. Though, it should be appreciated that the techniques as described above for enabling a set of wireless devices to communicate with each other may be employed regardless of the specific types of data communicated among those devices.

Figure 9:
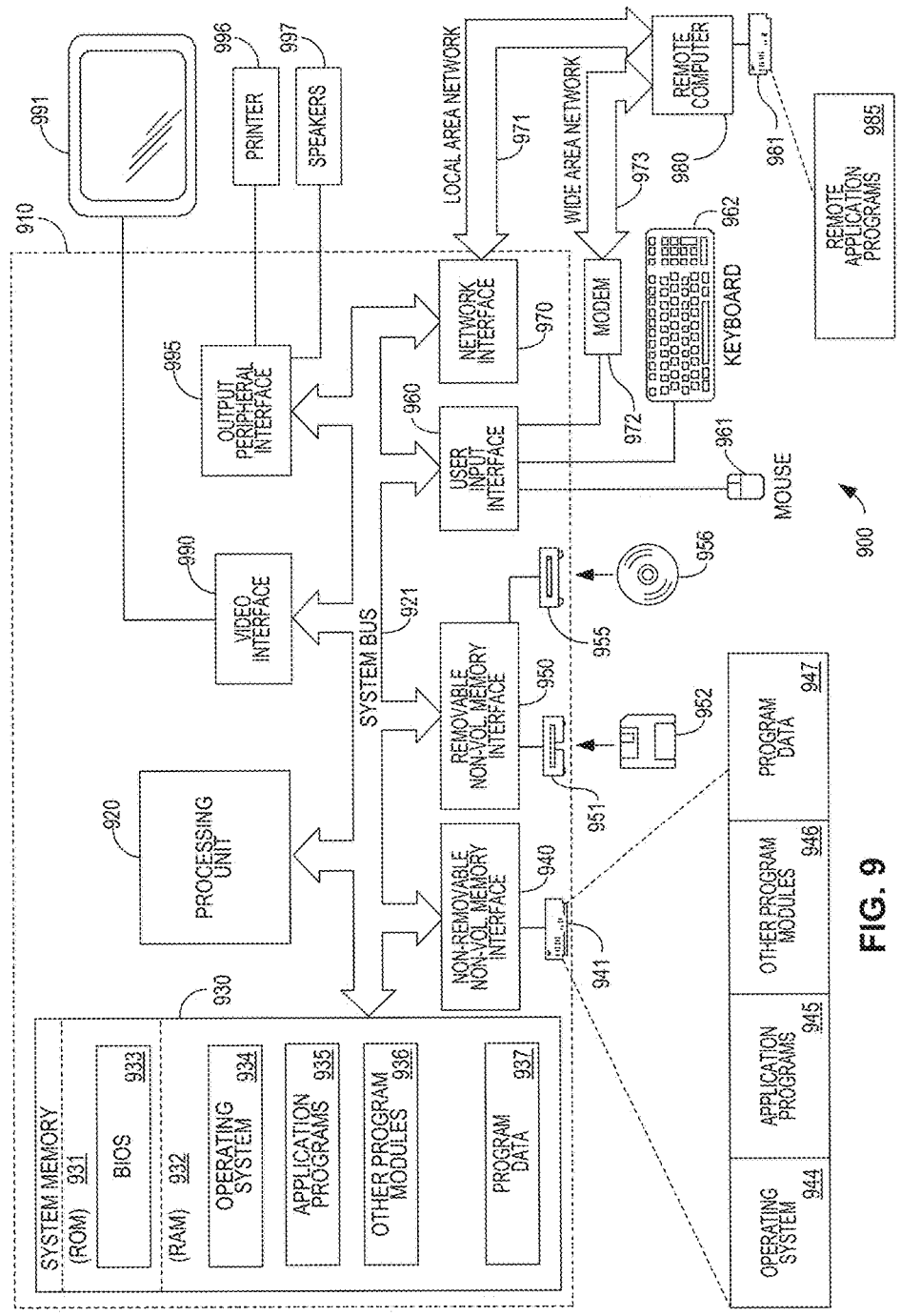
FIG. 9 is a sketch of an illustrative computing device in which some embodiments of the invention may be practiced.

The devices that communicate according to the techniques as described herein may be constructed in any suitable way. FIG. 9 illustrates an example of a suitable user device. Though FIG. 9 can also be taken as an example of a remote device.

FIG. 9 illustrates an example of a suitable computing system environment 900 on which the invention may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the invention includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, embodiments were described in which all members of a group store a persistent group profile and then retrieve that profile to re-form a group. In other embodiments, only a subset of devices in a group may have a group profile. As a specific example, a client device in the group may store a group profile that identifies a group owner, but that group owner may not store a profile.

Also, communication techniques were described that may be performed on a wireless computing device. The functions described herein may be encoded in functional modules as described above. Though, some or all of those functions may alternatively or additionally be implemented in a driver, operating system component or application executing on a computing device. In some embodiments, some or all of the functions described herein may be implemented in hardware components of a computing device.

Further, though exemplary devices were illustrated as being wireless computing devices, some or all of the functions described herein may be implemented in devices that are not configured for computing functions. Accordingly, the type of device performing functions as described herein is not a limitation on the invention.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed on a computing device, the method comprising:
   designating, by the computing device, a plurality of subsets of one or more devices, where each of the one or more devices in each of the subsets is part of a group of devices, and where each device in the group previously established a pairing with the computing device;
   transmitting, by the computing device, an invitation for the one or more devices in a selected one of the plurality of subsets of one or more devices to re-establish communications with the computing device, where the transmitted invitation includes at least one identifier for the one or more devices in the selected one of the plurality of subsets;
   receiving, by the computing device, requests to re-establish the communications from the one or more devices identified in the transmitted invitation; and
   re-establishing, by the computing device in response to the received requests, communications with at least one of the one or more devices identified in the transmitted invitation.

2. The method of claim 1 where the at least one identifier comprises an identifier for each device of the one or more devices in the selected one of the plurality of subsets.

3. The method of claim 1 further comprising:
   generating, by the computing device subsequent to the designating, identifiers for the plurality of subsets of one or more devices; and
   providing, by the computing device, each identifier to the one or more devices of the subset of the plurality of subsets that corresponds to the each identifier.

4. The method of claim 3 where the at least one identifier is the generated identifier that corresponds to the selected one of the plurality of subsets.

5. The method of claim 1 further comprising storing, by the computing device, profile information corresponding to the previously established pairings of each device in the group with the computing device.

6. The method of claim 5 where the communications are re-established based on the stored profile information.

7. The method of claim 1 where the transmitting is in response to a triggering event that indicates a scenario in which the computing device can utilize the one or more devices of the selected one of the plurality of subsets.

8. A computing device comprising:
   at least one processor;
   memory that is coupled to the at least one processor and that includes computer-executable instructions that, based on execution by the at least one processor, configure the computing device to perform actions comprising:
      designating, by the computing device, a plurality of subsets of one or more devices, where each of the one or more devices in each of the subsets is part of a group of devices, and where each device in the group previously established a pairing with the computing device;
      transmitting, by the computing device, an invitation for the one or more devices in a selected one of the plurality of subsets of one or more devices to re-establish communications with the computing device, where the transmitted invitation includes at least one identifier for the one or more devices in the selected one of the plurality of subsets;
      receiving, by the computing device, requests to re-establish the communications from the one or more devices identified in the transmitted invitation; and
      re-establishing, by the computing device in response to the received requests, communications with at least one of the one or more devices identified in the transmitted invitation.

9. The computing device of claim 8 where the at least one identifier comprises an identifier for each device of the one or more devices in the selected one of the plurality of subsets.

10. The computing device of claim 8, the actions further comprising:
    generating, by the computing device subsequent to the designating, identifiers for the plurality of subsets of one or more devices; and
    providing, by the computing device, each identifier to the one or more devices of the subset of the plurality of subsets that corresponds to the each identifier.

11. The computing device of claim 10 where the at least one identifier is the generated identifier that corresponds to the selected one of the plurality of subsets.

12. The computing device of claim 8, the actions further comprising storing, by the computing device, profile information corresponding to the previously established pairings of each device in the group with the computing device.

13. The computing device of claim 12 where the communications are re-established based on the stored profile information.

14. The computing device of claim 8 where the transmitting is in response to a triggering event that indicates a scenario in which the computing device can utilize the one or more devices of the selected one of the plurality of subsets.

15. At least one hardware computer storage medium that includes computer-executable instructions that, based on execution by a computing device, configure the computing device to perform actions comprising:
    designating, by the computing device, a plurality of subsets of one or more devices, where each of the one or more devices in each of the subsets is part of a group of devices, and where each device in the group previously established a pairing with the computing device;
    transmitting, by the computing device, an invitation for the one or more devices in a selected one of the plurality of subsets of one or more devices to re-establish communications with the computing device, where the transmitted invitation includes at least one identifier for the one or more devices in the selected one of the plurality of subsets;
    receiving, by the computing device, requests to re-establish the communications from the one or more devices identified in the transmitted invitation; and
    re-establishing, by the computing device in response to the received requests, communications with at least one of the one or more devices identified in the transmitted invitation.

16. The at least one hardware computer storage medium of claim 15 where the at least one identifier comprises an identifier for each device of the one or more devices in the selected one of the plurality of subsets, or where the transmitting is in response to a triggering event that indicates a scenario in which the computing device can utilize the one or more devices of the selected one of the plurality of subsets.

17. The at least one hardware computer storage medium of claim 15, the actions further comprising:

generating, by the computing device subsequent to the designating, identifiers for the plurality of subsets of one or more devices; and providing, by the computing device, each identifier to the one or more devices of the subset of the plurality of subsets that corresponds to the each identifier.

18. The at least one hardware computer storage medium of claim 17 where the at least one identifier is the generated identifier that corresponds to the selected one of the plurality of subsets.

19. The at least one hardware computer storage medium of claim 15, the actions further comprising storing, by the computing device, profile information corresponding to the previously established pairings of each device in the group with the computing device.

20. The at least one hardware computer storage medium of claim 19 where the communications are re-established based on the stored profile information.

* * * * *